United States Patent
Bishop et al.

(10) Patent No.: US 7,276,543 B2
(45) Date of Patent: Oct. 2, 2007

(54) RADIATION CURABLE RESIN COMPOSITION

(75) Inventors: Timothy E. Bishop, Algonquin, IL (US); Paul E. Snowwhite, Muskego, WI (US); Tyson Norlin, Melrose Park, IL (US); James J. Schouten, Elmhurst, IL (US); John Southwell, Glenn Ellyn, IL (US); Anthony Toussaint, Chicago, IL (US)

(73) Assignee: DSM IP Assets B.V., TE, Heerlen (NL)

( * ) Notice: Subject to any disclaimer, the term of this patent is extended or adjusted under 35 U.S.C. 154(b) by 103 days.

(21) Appl. No.: 09/972,203

(22) Filed: Oct. 9, 2001

(65) Prior Publication Data

US 2003/0100627 A1 May 29, 2003

(51) Int. Cl.
*C08F 2/50* (2006.01)

(52) U.S. Cl. ............. 522/96; 522/6; 522/8; 522/9; 522/10; 522/77; 522/90; 522/97; 522/151; 522/153; 522/173; 522/174; 522/182; 522/150; 428/378; 428/308; 428/383

(58) Field of Classification Search ............. 522/6, 522/8, 9, 10, 77, 90, 96, 97, 150, 151, 152, 522/173, 174, 182; 428/378, 380, 383
See application file for complete search history.

(56) References Cited

U.S. PATENT DOCUMENTS

| | | | |
|---|---|---|---|
| 4,131,529 A | 12/1978 | Osterloh | |
| 4,782,129 A * | 11/1988 | Moschovis et al. | 528/49 |
| 4,900,763 A | 2/1990 | Kraushaar | |
| 5,246,728 A | 9/1993 | Rodriquez | |
| 5,585,201 A | 12/1996 | Ha | |
| 5,863,997 A | 1/1999 | Smith | |
| 6,057,034 A * | 5/2000 | Yamazaki et al. | 428/378 |
| 6,136,880 A * | 10/2000 | Snowwhite et al. | 522/64 |
| 6,225,389 B1 | 5/2001 | Saint Victor | |
| 6,359,025 B1 * | 3/2002 | Snowwhite et al. | 522/64 |

FOREIGN PATENT DOCUMENTS

WO 98/50317 11/1998

* cited by examiner

*Primary Examiner*—Sanza L. McClendon
(74) *Attorney, Agent, or Firm*—Nixon & Vanderhye P.C.

(57) ABSTRACT

The present invention relates to a coated optical fiber comprising a glass optical fiber with a single protective coating or a combination of an inner and an outer primary coating applied thereon and optionally with a colored coating subsequently applied thereon wherein the inner primary coating or at least a portion of the single coating is prepared from a radiation curable composition which when cured as a capillary film with a 100W medium pressure mercury lamp has a percentage reacted acrylate unsaturation of at least about 54% after exposure to a dose of about 4.4 $mJ/cm^2$ or wherein the outer primary coating is prepared from a radiation curable composition which when cured as a capillary film with a 100 W medium pressure mercury lamp has a percentage reacted acrylate unsaturation of at least about 56% after exposure to a dose of about 4.4 $mJ/cm^2$. The invention further relates to a radiation curable composition having a high cure speed.

57 Claims, 3 Drawing Sheets

RADIATION CURABLE RESIN COMPOSITION

CROSS REFERENCE TO RELATED APPLICATIONS

This application claims priority from U.S. patent application Ser. No. 09/475,024, filed Dec. 30, 1999; from U.S. patent application Ser. No. 09/544,209, filed Apr. 7, 2000; and from international application PCT/NL01/00278, filed Apr. 5, 2001. All three applications are hereby incorporated in their entirety by reference.

FIELD OF THE INVENTION

The present invention relates to a coated optical fiber comprising a cured coating prepared from a radiation curable composition having improved cure speed without deteriorating the yellowing performance of the cured coating. In particular, the radiation-curable composition of the present invention is a liquid curable composition that can be formulated for use in a wide variety of applications including, for example, coatings and/or binders. In particular, these curable compositions offer relatively fast cure speeds which offer advantages in many applications such as in the production of fiber optics. In the latter, production speeds make it desirable to utilize primary coatings, secondary coatings, matrix materials, bundling materials (all of which can be transparent or colored) and/or inks that can be cured rapidly. Moroever, the present invention relates to a radiation curable composition, to a cured coating and to a method of increasing the cure speed of a radiation curable composition.

BACKGROUND OF THE INVENTION

In the production of optical fibers, a resin coating is applied immediately after drawing of the glass fibers for protection and reinforcement of the glass fiber. Generally, two coatings are applied, a soft primary coating layer of a flexible resin (low modulus and low Tg) which is coated directly on the glass surface and a secondary coating layer of a rigid resin (higher modulus and higher Tg) which is provided over the primary coating layer. Often, the fibers for identification purposes will be further coated with an ink, which is a curable resin comprising a colorant (such as a pigment and/or a dye), or the secondary coating may be a colored secondary coating (i.e, comprise a colorant).

Several coated (and optionally inked) optical fibers can be bundled together to form a so-called optical fiber ribbon, e.g., four or eight coated (and optionally inked) optical fibers are arranged on a plane and secured with a binder to produce a ribbon structure having a rectangular cross section. Said binder material for binding several optical fibers to produce the optical fiber ribbon structure is called a ribbon matrix material. In addition, a material for the further binding of several optical fiber ribbons to produce multi-core optical fiber ribbons is called a bundling material.

One of the most important characteristics required nowadays for curable resins used as coating materials (for protective or identification purposes) for optical fibers is to have a cure speed that is sufficiently high to be applicable at the currently used increasing optical fiber drawing speeds while still being cured thoroughly. Moreover, this improved cure speed should be obtained without sacrificing the chemical and mechanical properties of the cured coating. At present, in the production of optical fibers and optical fiber assemblies, one of the limitations on how fast the production line can be operated is the cure speed of the coatings and/or binders. Accordingly, it is desirable to develop coatings and/or binders with faster cure speed.

Besides having a high cure speed, the coating must also fulfill many other requirements, in particular: exhibiting very little physical change over a long period of time and also over wide temperature ranges; having acceptable resistance to heat and light (and thus, showing acceptable aging properties such as a low degree of yellowing), to hydrolysis, to oil, and to chemicals such as acids and alkalis; absorbing only a relatively small amount of moisture and water; producing little hydrogen gas which adversely affects optical fibers; and the like.

Resins that cure on exposure to radiation such as ultraviolet radiation are favored in the industry, due to their fast cure, enabling the coated fiber to be produced at high speed. In many of these radiation curable resin compositions, use is made of urethane oligomers having reactive terminal groups (such as an acrylate or methacrylate functionality, herein referred to as (meth)acrylate functionality) and a polymer backbone. Generally, these compositions may further comprise reactive diluents, photoinitiators, and optionally suitable additives.

From WO 98/00351 it is known to use a mixture of two hydrogen abstraction free-radical photoinitiators and one α-cleavage, homolytic free-radical photoinitiator, in particular a mixture of 1.5 wt. % benzophenone, 0.5 wt. % benzil with sensitizer diethyl amine and 0.7 wt. % Irgacure 651.

Photoinitiator packages are commercially available e.g. Esacure KTO 46 (consisting of a benzophenone derivative, a phosphine oxide type photoinitiator and an oligomeric α-hydroxy acetophenone) and Esacure KIP 100 F that is a mixture of 70% of an oligomeric α-hydroxy acetophenone and 30% of dimethyl hydroxy acetophenone.

So far, however, the known radiation-curable compositions also if they comprise a combination of photoinitiators in varying amounts do not provide satisfying properties with respect to cure speed in combination with mechanical and aging properties of the resulting cured coating. Moreover, using a high amount of photoinitiator often results in drawbacks such as a relatively high amount of extractables, yellowing of the cured coating over time, and other undesired properties.

An object of the present invention is to provide a coated optical fiber comprising a cured coating prepared from a liquid curable resin composition which exhibits a fast cure speed without impairing mechanical properties and aging characteristics of the coating. In particular, a coated optical fiber comprising a cured coating having a relatively low yellowing is desired. A further object of the present invention is to provide a radiation curable composition having improved cure speed and a method of increasing the cure speed of a radiation curable composition.

SUMMARY OF THE INVENTION

The present invention provides a coated optical fiber comprising a glass optical fiber with a single protective coating or a combination of an inner and an outer primary coating applied thereon and optionally with a colored coating subsequently applied thereon wherein the inner primary coating or at least a portion of the single coating is prepared from a radiation curable composition which when cured as a capillary film with a 100 W medium pressure mercury lamp has a percentage reacted acrylate unsaturation of at least about 54% after exposure to a dose of about 4.4 mJ/cm$^2$ or wherein the outer primary coating is prepared from a radiation curable composition which when cured as a capillary film with a 100 W medium pressure mercury lamp has a percentage reacted acrylate unsaturation of at least about 56% after exposure to a dose of about 4.4 mJ/cm$^2$.

According to the present invention, at least one of said coatings is prepared from a radiation curable composition which when cured as a capillary film with a 100 W medium pressure mercury lamp has a percentage reacted acrylate unsaturation of at least about 56% after exposure to a dose of about 4.4 mJ/cm$^2$.

Further, the present invention provides a radiation curable composition comprising
(A) an oligomer,
(B) a reactive diluent, and
(C) a photoinitiator package of at least two free radical photoinitiators having an overall absorption spectrum in methanol which is the sum of the absorption spectra of each individual photoinitiator wherein said overall absorption spectrum has a minimum value of a molar extinction coefficient $\epsilon$ in a range between 280 nm ($\lambda_1$) and 320 nm ($\lambda_2$) of at least about 600 lmol$^{-1}$cm$^{-1}$.

The invention also provides a radiation curable composition comprising
(A) an oligomer,
(B) a reactive diluent, and
(C) at least three free radical photoinitiators wherein
  (i) at least one of the photoinitiators has an absorption spectrum in acetonitrile having a difference between two absorption maxima $\Delta\lambda_{max(1ij)}=(\lambda_{max})_{1j}-(\lambda_{max})_{1i}$ in the range between 240 and 360 nm of at least about 15 nm, and wherein
  (ii) considering at least two of the photoinitiators (1 and 2), the difference between the absorption maximum $(\lambda_{max})_1$ of the absorption spectrum in acetonitrile of photoinitiator 1 and the absorption maximum $(\lambda_{max})_2$ of the absorption spectrum in acetonitrile of photoinitiator 2 $\Delta\lambda_{max(12)}=(\lambda_{max})_2-(\lambda_{max})_1$ in the range between 280 and 320 nm is at least about 5 nm.

Furthermore, the invention provides a radiation curable coating composition for optical glass fiber comprising
(A) an oligomer,
(B) a reactive diluent, and
(C) at least four different photoinitiators (C1), (C2), (C3), and (C4).

Suprisingly, the coated optical fiber of the present invention has good properties even if produced at extremely high line speeds whereas other coated optical fibers have inferior quality. In particular, the radiation curable composition according to the present invention overcomes all the drawbacks of the prior art composition by choosing combinations and amounts of photoinitiators in such a way that an improved cure speed can be obtained without substantially deteriorating mechanical properties and yellowing characteristics (including initial yellowing and yellowing upon aging).

The composition is applied to a substrate and cured. The compositions of the invention are preferably designed for use as a colored or uncolored optical fiber single protective coating, primary (or inner primary) coating, secondary (or outer primary) coating or related optical fiber protective materials such as matrix or bundling materials. Such optical fiber coatings have their own set of unique performance requirements, which distinguish them from conventional applications.

Finally, the present invention provides a cured coating and a method for increasing the cure speed of a radiation curable composition.

DETAILED DESCRIPTION OF THE PRESENT INVENTION

Figure 1:
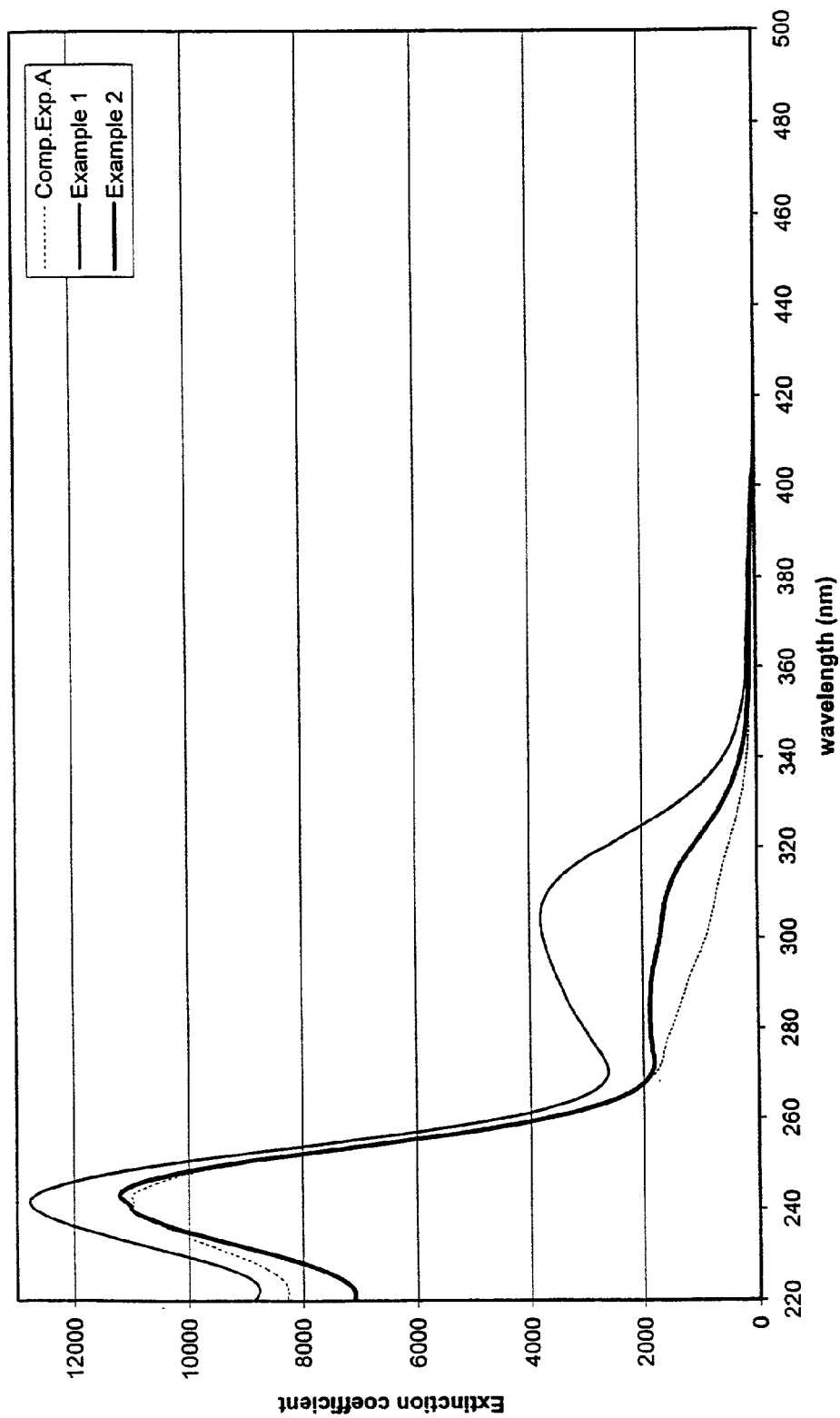
FIG. 1 shows a graph of extinction coefficient versus wavelength.

The key element in obtaining the improved coated optical fiber of the present invention is the use of the radiation curable coating composition of the present invention having improved cure speed. Therefore, the description will further be directed to the radiation curable coating composition. Blends of oligomers, reactive diluents, and other ingredients such as release additives, colorants, and other conventional additives can be used to tailor the properties to achieve the design criteria for the given application.

A key characteristic of the present invention is the ability to formulate compositions that exhibit improved cure speed without introducing a substantially higher sensitivity to yellowing over time and/or under different aging conditions. It is preferred to obtain an improved cure speed while at the meantime meeting or improving on the yellowing attributely demanded of fiber optic coatings. Although not wanting to be limited by any particular theory, it is believed that in one embodiment this results from the unique combination and optimization of oligomers, monomers (reactive diluents), photoinitiators, and stabilizers. The present inventors were the first ones to find out, after extensive formulating experiments, the improved oligomer/monomer/photoinitiator combinations resulting in the radiation curable coating composition of the present invention having improved cure speed.

In one preferred embodiment of the present invention it is believed that the present improvements result from the presence of relatively low amounts of different photoinitiators having different absorption spectra. The different absorption characteristics of the initiators might improve the overall absorption of the incident light. However, the exact proportions of the photoinitiators giving maximum performance have to be determined by experimental measurements for each application. The present inventors were the first ones to find out, after extensive experimentation, the improved photoinitiator package of the present invention resulting in a radiation curable coating composition having improved cure speed.

For the inner primary coating compositions of the present invention it is preferred to choose the oligomer and monomer package and to improve the photoinitiator package in such a way as to achieve the required relatively high cure speed.

The coated optical fiber and radiation curable compositions of the present invention are now described in more detail.

In one embodiment of the present invention, the coated optical fiber comprises a glass optical fiber with a single protective coating or a combination of an inner and an outer primary coating applied thereon and optionally with a colored coating subsequently applied thereon wherein at least one of said coatings is prepared from a radiation curable composition which when cured as a capillary film with a 100 W medium pressure mercury lamp has a percentage reacted acrylate unsaturation of at least about 56% after exposure to a dose of about 4.4 mJ/cm$^2$. Surprisingly, the radiation curable composition of the present invention achieves a high % RAU after application of only a very small UV-dose.

In order to determine the % RAU, the radiation curable composition is applied as a liquid between two crystal plates in a FTIR (Fourier Transform Infra Red) instrument (herein referred to as a capillary film). This implies that there is no substantial surface inhibition from oxygen in the air, but small amounts of dissolved oxygen might still be present in the sample. The capillary film of the radiation curable composition is then UV-cured with a 100 W medium pressure mercury lamp while measuring in real time FTIR the surface or area under the acrylate peak at 810 $cm^{-1}$, further called the percentage unreacted acrylate unsaturation. When using a 100 W medium pressure mercury lamp, the energy on the coating area is adjusted to be about 22 mW. The decrease of the peak surface over time or as a function of the cure dose applied gives an indication of the cure speed. This method is described in more detail under the "Test methods" section.

Suitable compositions include those having a percentage reacted acrylate unsaturation after exposure to a dose of 4.4 $mJ/cm^2$ is of at least about 56%, preferably, at least about 57%, more preferred, at least about 58%, particularly preferred, at least about 60%, and most preferred, at least about 66%. Generally, the percentage reacted acrylate unsaturation after exposure to a dose of 4.4 $mJ/cm^2$ is about 95% or less. However, a % RAU of about 90% or less is also acceptable.

Preferred outer primary coating compositions include those having a percentage reacted acrylate unsaturation after exposure to a dose of 2.9 $mJ/cm^2$ of at least about 49%, preferably, at least about 52%, more preferred, at least about 54%, particularly preferred, at least about 56%, and most preferred, at least about 62%. Generally, the percentage reacted acrylate unsaturation after exposure to a dose of 2.9 $mJ/cm^2$ is about 95% or less. However, a % RAU of about 85% or less is also acceptable.

Preferred inner primary coating compositions include those having a percentage reacted acrylate unsaturation after exposure to a dose of 2.9 $mJ/cm^2$ of at least about 26%, preferably, at least about 30%, more preferred, at least about 40%, particularly preferred, at least about 42%, and most preferred, at least about 55%. Generally, the percentage reacted acrylate unsaturation after exposure to a dose of 2.9 $mJ/cm^2$ is about 95% or less. However, a % RAU of about 85% or less is also acceptable.

In a further preferred embodiment the coated optical fiber of the present invention comprises at least a cured inner primary coating or at least a cured outer primary coating showing in addition to the relatively high cure speed a good yellowing performance over time.

Preferred inner primary coatings having a relatively low amount of yellowing are those prepared from a radiation curable composition, which when applied as a 500 microns thick layer on a glass plate and cured at 1.0 $J/cm^2$ under 0.2 $m^3/min$ of $N_2$ and when having an outer primary coating subsequently applied and cured thereon, shows a color change $\Delta E$ of less than about 30 after aging for 8 weeks under low intensity fluorescent light. More preferred is a color change $\Delta E$ after aging for 8 weeks under low intensity fluorescent light of about 20 or less, particularly preferred, about 15 or less, and most preferred, about 10 or less.

Preferred outer primary coatings having a relatively low amount of yellowing are those prepared from a radiation curable composition, which when is applied as a 500 microns thick layer on a glass plate and cured at 1.0 $J/cm^2$ under 0.2 $m^3/min$ of $N_2$ shows a color change $\Delta E$ of less than about 20 after aging for 8 weeks under low intensity fluorescent light. More preferred is a color change $\Delta E$ after aging for 8 weeks under low intensity fluorescent light of about 17 or less, particularly preferred, about 15 or less, and most preferred, about 10 or less.

According to another yellowing test, preferred outer primary coatings of the present invention having a relatively low amount of yellowing are those prepared from a radiation curable composition, which when is applied as a 500 microns thick layer on a glass plate and cured at 1.0 $J/cm^2$ under 0.2 $m^3/min$ of $N_2$ shows a color change $\Delta E$ of less than about 75 after aging for 8 weeks at a temperature of about 125° C. More preferred, less than about 73, particularly preferred, less than about 70.

In another embodiment of the present invention good results were obtained by using particular photoinitiator packages, in particular, the radiation curable composition having improved cure speed comprising (A) an oligomer,
(B) a reactive diluent, and
(C) a photoinitiator package of at least two free radical photoinitiators having an overall absorption spectrum in methanol which is the sum of the absorption spectra of each individual photoinitiator wherein said overall absorption spectrum has a minimum value of a molar extinction coefficient $\epsilon$ in a range between 280 nm ($\lambda_1$) and 320 nm ($\lambda_2$) of at least about 525 $lmol^{-1}cm^{-1}$. Preferably, the minimum value of the molar extinction coefficient is at least about 600 $lmol^{-1}cm^{-1}$, more preferably, at least about 900 $lmol^{-1}cm^{-1}$, and most preferably at least about 1,000 $lmol^{-1}cm^{-1}$. The minimum value of $\epsilon$ is preferably less than about 50,000 $lmol^{-1}cm^{-1}$, more preferably, less than about 20,000 $lmol^{-1}cm^{-1}$.

Moreover, the overall absorption spectrum of the mixture of photoinitiators (Ci) used in the curable composition of the present invention can also be characterized by an average value of the molar extinction coefficient. Preferably, the overall absorption spectrum of the photoinitiators (Ci) in methanol is characterized by an average value of $\epsilon$ of at least about 980 $lmol^{-1}cm^{-1}$ in a range between 280 nm ($\lambda_1$) and 320 nm ($\lambda_2$). More preferably, the average value of $\epsilon$ is at least about 1,200 $lmol^{-1}cm^{-1}$, particularly preferred, at least about 1,600 $lmol^{-1}cm^{-1}$ and most preferred, at least about 2,200 $lmol^{-1}cm^{-1}$. The average value of $\epsilon$ of the overall absorption spectrum preferably is less than about 60,000 $lmol^{-1}cm^{-1}$, more preferably less than about 30,000 $lmol^{-1}cm^{-1}$. When the photoinitiator package has a too high molar extinction coefficient, less thick films can be cured.

Preferably, the overall absorption spectrum of the photoinitiator package shows a peak or shoulder in the range between 280 and 320 nm. This can be seen in FIG. 1 which shows the absorption spectra in methanol of the photoinitiator packages used in the radiation-curable compositions of Examples 1 and 2 and Comparative Experiment A.

In a further embodiment of the present invention, the radiation curable composition having optimized cure speed comprises (A) an oligomer,
(B) a reactive diluent, and
(C) at least three free radical photoinitiators wherein
(i) at least one of the photoinitiators has an absorption spectrum in acetonitrile having a difference between two absorption maxima $\Delta\lambda_{max(1ij)} = (\lambda_{max})_{1j} - (\lambda_{max})_{1i}$ in the range between 240 and 360 nm of at least about 15 nm, and wherein
(ii) considering at least two of the photoinitiators (1 and 2), the difference between the absorption maximum $(\lambda_{max})_1$ of the absorption spectrum in acetonitrile of a first photoinitiator 1 and the absorption maximum $(\lambda_{max})_2$ of the absorption spectrum in acetonitrile of a second photoinitiator 2 $\Delta\lambda_{max(12)} = (\lambda_{max})_2 - (\lambda_{max})_1$ in the range between 280 and 320 nm is at least about 5 nm.

It will be understood that $\lambda_{max}$ is a point on the curve wherein the tangent to the curve is parallel with the horizontal axis.

Preferably, the difference $\Delta\lambda_{max(1ij)}$ is at least about 17 nm, more preferably, at least about 18 nm, particularly preferred, at least about 20 nm, and most preferred at least about 22 nm. Preferably, the difference $\Delta\lambda_{max(12)}$ is at least about 6 nm, more preferably, at least about 8 nm, particularly preferred, at least about 9 nm, and most preferred at least about 10 nm.

In a further embodiment of the invention, the radiation curable coating composition for optical glass fiber comprises
(A) an oligomer,
(B) a reactive diluent, and
(C) at least four different photoinitiators (C1), (C2), (C3), and (C4).

The radiation curable composition of the present invention preferably is substantially solvent free. This means that the composition as stored and/or applied does contain less than 5 wt %, preferably less than 2 wt % organic solvent that is not coreactive in polymerisation reactions. These solvents have to or will evaporate before, during or after cure. In a particular preferred embodiment, the amount of non reactive solvent is less than about 0.5 wt %.

The radiation curable composition preferably has more than 90% by wt radical curable components.

The radiation curable composition comprises a radiation curable oligomer and a radiation curable diluent. Each of the components may be mono or polyfunctional, poly meaning 2 or more functional. Generally, the functionality of the radiation curable components is 12 or lower. Preferred functionality for at least one of the components is on average 1.8-4.

The terms diluent and oligomer are used in this specification to denote a compound with lower, respectively, higher viscosity. The oligomer generally will have a molecular weight of about 400 or higher and an average functionality of about 1.2 or higher, preferably an average functionality of about 1.8-4.

The reactive diluent has a viscosity that is lower than the viscosity of the oligomer. In case an oligomer is used with high viscosity, the diluent may have a molecular weight up to about 700.

(A) Oligomer

Generally, optical fiber coating materials comprise as an oligomer a urethane acrylate oligomer, comprising an acrylate group, urethane groups and a backbone. The backbone is derived from a polyol which has been reacted with a diisocyanate and hydroxyalkylacrylate. However, urethane-free ethylenically unsaturated oligomers may also be used.

Examples of suitable polyols are polyether polyols, polyester polyols, polycarbonate polyols, polycaprolactone polyols, acrylic polyols, and other polyols. These polyols may be used either individually or in combinations of two or more. There are no specific limitations to the manner of polymerization of the structural units in these polyols. Any of random polymerization, block polymerization, or graft polymerization is acceptable.

Given as examples of the polyether polyols are polyethylene glycol, polypropylene glycol, polypropylene glycol-ethyleneglycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds. Here, given as examples of the ion-polymerizable cyclic compounds are cyclic ethers such as ethylene oxide, isobutene oxide, tetrahydrofuran, 2-methyltetrahydrofuran, 3-methyltetrahydrofuran, dioxane, trioxane, tetraoxane, cyclohexene oxide, styrene oxide, epichlorohydrin, isoprene monoxide, vinyl oxetane, vinyl tetrahydrofuran, vinyl cyclohexene oxide, phenyl glycidyl ether, butyl glycidyl ether, and glycidyl benzoate. Specific examples of combinations of two or more ion-polymerizable cyclic compounds include combinations for producing a binary copolymer such as tetrahydrofuran and 2-methyltetrahydrofuran, tetrahydrofuran and 3-methyltetrahydrofuran, and tetrahydrofuran and ethylene oxide; and combinations for producing a ternary copolymer such as a combination of tetrahydrofuran, 2-methyltetrahydrofuran, and ethylene oxide, a combination of tetrahydrofuran, butene-1-oxide, and ethylene oxide, and the like. The ring-opening copolymers of these ion-polymerizable cyclic compounds may be either random copolymers or block copolymers.

Included in these polyether polyols are products commercially available under the trademarks, for example, PTMG1000, PTMG2000 (manufactured by Mitsubishi Chemical Corp.), PEG#1000 (manufactured by Nippon Oil and Fats Co., Ltd.), PTG650 (SN), PTG1000 (SN), PTG2000 (SN), PTG3000, PTGL1000, PTGL2000 (manufactured by Hodogaya Chemical Co., Ltd.), PEG400, PEG600, PEG1000, PEG1500, PEG2000, PEG4000, PEG6000 (manufactured by Daiichi Kogyo Seiyaku Co., Ltd.) and Pluronics (by BASF).

Polyester diols obtained by reacting a polyhydric alcohol and a polybasic acid are given as examples of the polyester polyols. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer acid, isophthalic acid, terephthalic acid, maleic acid, fumaric acid, adipic acid, sebasic acid, and the like can be given.

These polyester polyol compounds are commercially available under the trademarks such as MPD/IPA500, MPD/IPA1000, MPD/IPA2000, MPD/TPA500, MPD/TPA1000, MPD/TPA2000, Kurapol A-1010, A-2010, PNA-2000, PNOA-1010, and PNOA-2010 (manufactured by Kuraray Co., Ltd.).

As examples of the polycarbonate polyols, polycarbonate of polytetrahydrofuran, poly(hexanediol carbonate), poly(nonanediol carbonate), poly(3-methyl-1,5-pentamethylene carbonate), and the like can be given.

As commercially available products of these polycarbonate polyols, DN-980, DN-981 (manufactured by Nippon Polyurethane Industry Co., Ltd.), Priplast 3196, 3190, 2033 (manufactured by Unichema), PNOC-2000, PNOC-1000 (manufactured by Kuraray Co., Ltd.), PLACCEL CD220, CD210, CD208, CD205 (manufactured by Daicel Chemical Industries, Ltd.), PC-THF-CD (manufactured by BASF), and the like can be given.

Polycaprolactone diols obtained by reacting e-caprolactone and a diol compound are given as examples of the polycaprolactone polyols having a melting point of 0° C. or higher. Here, given as examples of the diol compound are ethylene glycol, polyethylene glycol, polypropylene glycol, polypropylene glycol, tetramethylene glycol, polytetramethylene glycol, 1,2-polybutylene glycol, 1,6-hexanediol, neopentyl glycol, 1,4-cyclohexanedimethanol, 1,4-butanediol, and the like.

Commercially available products of these polycaprolactone polyols include PLACCEL 240, 230, 230ST, 220, 220ST, 220NP1, 212, 210, 220N, 210N, L230AL, L220AL, L220PL, L220PM, L212AL (all manufactured by Daicel Chemical Industries, Ltd.), Rauccarb 107 (by Enichem), and the like.

As examples of other polyols ethylene glycol, 1,4-butanediol, 1,5-pentanediol, 1,6-hexanediol, polyoxyethylene bisphenol A ether, polyoxypropylene bisphenol A ether, polyoxyethylene bisphenol F ether, polyoxypropylene bisphenol F ether, and the like can be given.

As these other polyols, those having a alkylene oxide structure in the molecule, in particular polyether polyols, are preferred. Specifically, polyols containing polytetramethylene glycol and copolymer glycols of butyleneoxide and ethyleneoxide are particularly preferred.

The reduced number average molecular weight derived from the hydroxyl number of these polyols is usually from about 50 to about 15,000, and preferably from about 1,000 to about 8,000.

Given as examples of the polyisocyanate used for the oligomer are 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanato-ethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, and the like. These polyisocyanate compounds may be used either individually or in combinations of two or more. Preferred polyisocyanates are isophorone diisocyanate, 2,2,4-trimethyihexamethylene diisocyanate, 2,4-tolylene diisocyanate, and 2,6-tolylene diisocyanate.

Examples of the hydroxyl group-containing (meth)acrylate used in the oligomer, include, (meth)acrylates derived from (meth)acrylic acid and epoxy and (meth)acrylates comprising alkylene oxides, more in particular, 2-hydroxy ethyl (meth)acrylate, 2-hydroxypropylacrylate and 2-hydroxy-3-oxyphenyl(meth)acrylate. Acrylate functional groups are preferred over methacrylates.

The ratio of polyol, polyisocyanate, and hydroxyl group-containing (meth)acrylate used for preparing the urethane (meth)acrylate is determined so that about 1.1 to about 3 equivalents of an isocyanate group included in the polyisocyanate and about 0.1 to about 1.5 equivalents of a hydroxyl group included in the hydroxyl group-containing (meth) acrylate are used for one equivalent of the hydroxyl group included in the glycol.

In the reaction of these three components, a urethanization catalyst such as copper naphthenate, cobalt naphthenate, zinc naphthenate, di-n-butyl tin dilaurate, triethylamine, and triethylenediamine-2-methyltriethyleneamine, is usually used in an amount from about 0.01 to about 1 wt % of the total amount of the reactant. The reaction is carried out at a temperature from about 10 to about 90° C., and preferably from about 30 to about 80° C.

The number average molecular weight of the urethane (meth)acrylate used in the composition of the present invention is preferably in the range from about 1,200 to about 20,000, and more preferably from about 2,200 to about 10,000. If the number average molecular weight of the urethane (meth)acrylate is less than about about 100, the resin composition tends to solidify; on the other hand, if the number average molecular weight is larger than about 20,000, the viscosity of the composition becomes high, making handling of the composition difficult. Particularly preferred for inner primary coatings are oligomers having a number average molecular weight between about 2,200 and about 5,500.

The urethane (meth)acrylate is used in an amount from about 10 to about 90 wt %, and preferably from about 20 to about 80 wt %, of the total amount of the resin composition. When the composition is used as a coating material for optical fibers, the range from about 20 to about 80 wt % is particularly preferable to ensure excellent coatability, as well as superior flexibility and long-term reliability of the cured coating.

Other oligomers that can be used include polyester (meth)acrylate, epoxy (meth)acrylate, polyamide (meth)acrylate, siloxane polymer having a (meth)acryloyloxy group, a reactive polymer obtained by reacting (meth)acrylic acid and a copolymer of glycidyl methacrylate and other polymerizable monomers, and the like. Particularly preferred are bisphenol A based acrylate oligomers such as alkoxylated bisphenol-A-diacrylate and diglycidyl-bisphenol-A-diacrylate.

Beside the above-described components, other curable oligomers or polymers may be added to the liquid curable resin composition of the present invention to the extent that the characteristics of the liquid curable resin composition are not adversely affected.

Preferred oligomers are polyether based acrylate oligomers, polycarbonate acrylate oligomers, polyester acrylate oligomers, alkyd acrylate oligomers and acrylated acrylic oligomers. More preferred are the urethane-containing oligomers thereof. Even more preferred are polyether urethane acrylate oligomers and urethane acrylate oligomers using blends of the above polyols, and particularly preferred are aliphatic polyether urethane acrylate oligomers. The term "aliphatic" refers to a wholly aliphatic polyisocyanate used. However, also urethane-free acrylate oligomers, such as urethane-free acrylated acrylic oligomers, urethane-free polyester acrylate oligomers and urethane-free alkyd acrylate oligomers are also preferred. If the oligomer comprises carbonate moieties, it is preferred that the oligomer has a molecular weight below 3,500 g/mol.

Preferred oligomers for inner primary coating include those derived from one or more of the following components:
(i) one or more polytetramethylene glycols (e.g. polytetrahydrofuran polyols);
(ii) isophorone diisocyanate, dicyclohexylmethane diisocyanate, and/or the trimer of hexamethylene diisocyanate; more preferably isophorone diisocyanate and/or dicyclohexylmethane diisocyanate; and
(iii) hydroxyethylacrylate.

Oligomers for inner primary coatings may, for instance, be derived from, relative to the weight of the oligomer:
10-30 wt % of isophorone diisocyanate;
5-15 wt % of dicyclohexylmethane diisocyanate;
45-75 wt % of polytetramethylene glycol; and
5-20 wt % of hydroxyethylacrylate.

Preferably, oligomers for inner primary coating compositions have a molecular weight in the range of 2,000-6,000 g/mol.

Preferred oligomers for outer primary coatings include those being derived from one or more of the following components:
(i) one or more polytetramethylene glycols (e.g. polytetrahydrofuran polyols);
(ii) isophorone diisocyanate and/or dicyclohexylmethane diisocyanate;
(iii) hydroxyethylacrylate;
(iv) hexane diol; and
(v) adipic acid.

Oligomers for outer primary coatings may, for instance, be derived from, relative to the weight of the oligomer:
25-35 wt % of isophorone diisocyanate and/or dicyclohexylmethane diisocyanate;
25-40 wt % of polytetramethylene glycol;
15-30 wt % of hydroxyethylacrylate;
5-15 wt % of hexane diol; and
5-15 wt % of adipic acid.

Preferably, oligomers for outer primary coatings have a molecular weight in the range of 1,000-5,000 g/mol.

(B) Reactive Diluent

Suitable reactive diluents are exemplified herein below.

Polymerizable vinyl monomers such as polymerizable monofunctional vinyl monomers containing one polymerizable vinyl group in the molecule and polymerizable polyfunctional vinyl monomers containing two or more polymerizable vinyl groups in the molecule may be added to the liquid curable resin composition of the present invention.

Given as specific examples of the polymerizable monofunctional vinyl monomers are vinyl monomers such as N-vinyl pyrrolidone, N-vinyl caprolactam, vinyl imidazole, and vinyl pyridine; (meth)acrylates containing an alicyclic structure such as isobornyl (meth)acrylate, bornyl (meth)acrylate, tricyclodecanyl (meth)acrylate, dicyclopentanyl (meth)acrylate, dicyclopentenyl (meth)acrylate, and cyclohexyl (meth)acrylate; benzyl (meth)acrylate, 4-butylcyclohexyl (meth)acrylate, acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, benzyl(meth)acrylate, phenoxyethyl (meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypropylene glycol (meth)acrylate, diacetone(meth) acrylamide, isobutoxy methyl(meth)acrylamide, N,N-dimethyl(meth)acrylamide, t-octyl(meth)acrylamide, dimethylaminoethyl (meth)acrylate, diethylaminoethyl(meth)acrylate, 7-amino-3,7-dimethyloctyl (meth)acrylate, N,N-diethyl(meth)acrylate, N,N-dimethyl amino propyl(meth)acrylamide, hydroxy butyl vinyl ether, lauryl vinyl ether, cetyl vinyl ether, 2-ethylhexyl vinyl ether, acrylate monomers shown by the following formulas (1) to (3),

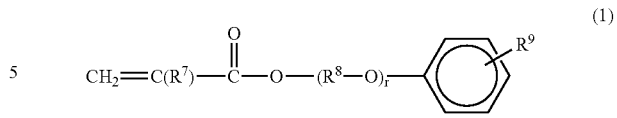

wherein $R^7$ is a hydrogen atom or a methyl group, $R^8$ is an alkylene group having 2-6, and preferably 2-4 carbon atoms, $R^9$ is a hydrogen atom or an organic group containing 1-12 carbon atoms or an aromatic ring, and r is an integer from 0 to 12, and preferably from 1 to 8,

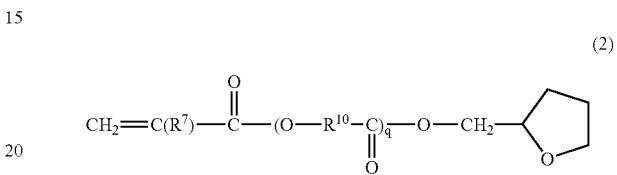

wherein $R^7$ is the same as defined above, $R^{10}$ is an alkylene group having 2-8, and preferably 2-5 carbon atoms, and q is an integer from 1 to 8, and preferably from 1 to 4,

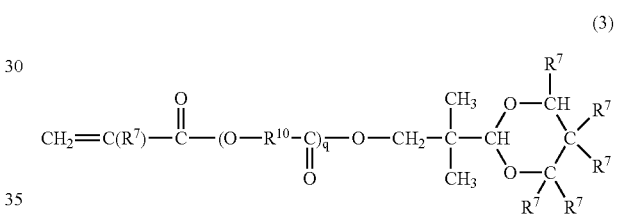

wherein $R^7$, $R^{10}$, and q are the same as defined above.

As examples of commercially available products of the polymerizable monofunctional vinyl monomers, Aronix M102, M110, M111, M113, M117 (manufactured by Toagosei Co., Ltd.), LA, IBXA, Viscoat #190, #192, #2000 (manufactured by Osaka Organic Chemical Industry Co., Ltd.), Light Acrylate EC-A, PO-A, NP-4EA, NP-8EA, M-600A, HOA-MPL (manufactured by Kyoeisha Chemical Co., Ltd.), KAYARAD TC110S, R629, R644 (manufactured by Nippon Kayaku Co., Ltd.), and the like can be given.

Given as examples of the polymerizable polyfunctional vinyl monomers are the following acrylate compounds: trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropanetrioxyethyl (meth)acrylate, tris(2-hydroxyethyl)isocyanurate tri(meth)acrylate, tris(2-hydroxyethyl) isocyanurate di(meth)acrylate, bis(hydroxymethyl) tricyclodecane di(meth)acrylate, di(meth)acrylate of a diol which is an addition compound of ethylene oxide or propylene oxide to bisphenol A, di(meth)acrylate of a diol which is an addition compound of ethylene oxide or propylene oxide to hydrogenated bisphenol A, epoxy(meth)acrylate obtained by the addition of (meth)acrylate to diglycidyl ether of bisphenol A, diacrylate of polyoxyalkylene bisphenol A, and triethylene glycol divinyl ether.

Examples of commercially available products of the polymerizable polyfunctional vinyl monomers include Yupimer UV SA1002, SA2007 (manufactured by Mitsubishi Chemical Corp.), Viscoat #195, #230, #215, #260, #335HP, #295, #300, #700 (manufactured by Osaka Organic Chemical Industry Co., Ltd.), Light Acrylate 4EG-A, 9EG-A, NP-A, DCP-A, BP-4EA, BP-4PA, PE-3A, PE-4A, DPE-6A (manufactured by Kyoeisha Chemical Co., Ltd.), KAYARAD R-604, DPCA-20,-30,-60,-120, HX-620, D-310, D-330 (manufactured by Nippon Kayaku Co., Ltd.), Aronix M-208, M-210, M-215, M-220, M-240, M-305, M-309, M-315, M-325 (manufactured by Toagosei Co., Ltd.), and the like.

These polymerizable vinyl monomers are used in an amount from about 10 to about 70 wt %, and preferably from about 15 to about 60 wt %, of the total amount of the resin composition. If the amount is less than about 10 wt %, the viscosity of the composition is so high that coatability is impaired. The amount exceeding about 70 wt % may result in not only an increased cure shrinkage, but also insufficient toughness of the cured products.

Preferred reactive diluents are alkoxylated alkyl substituted phenol acrylate, such as ethoxylated nonyl phenol acrylate and propoxylated nonyl phenol acrylate, vinyl monomers such as vinyl caprolactam, isodecyl acrylate, and alkoxylated bisphenol A diacrylate such as ethoxylated bisphenol A diacrylate.

(C) Photoinitiator

When the liquid curable resin composition of the present invention is cured by radiation, a photo-polymerization initiator is used.

In a preferred embodiment of the present invention, the photoinitiators (Ci) are free radical photoinitiators.

Free-radical photoinitiators are generally divided into two classes according to the process by which the initiating radicals are formed. Compounds that undergo unimolecular bond cleavage upon irradiation are termed Type I or homolytic photoinitiators, as shown by formula (1):

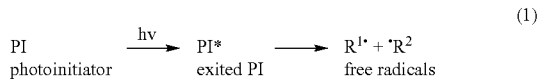

(1)

Depending on the nature of the functional group and its location in the molecule relative to the carbonyl group, the fragmentation can take place at a bond adjacent to the carbonyl group ($\alpha$-cleavage), at a bond in the $\beta$-position ($\beta$-cleavage) or, in the case of particularly weak bonds (like C—S bonds or O—O bonds), elsewhere at a remote position. By far the most important fragmentation in photoinitiator molecules is the $\alpha$-cleavage of the carbon-carbon bond between the carbonyl group and the alkyl residue in alkyl aryl ketones which is known as the Norrish Type I reaction.

If the excited state photoinitiator interacts with a second molecule (a coinitiator COI) to generate radicals in a bimolecular reaction as shown by formula (2), the initiating system is termed a Type II photoinitiator. In general, the two main reaction pathways for Type II photoinitiators are hydrogen abstraction by the excited initiator or photoinduced electron transfer, followed by fragmentation. Bimolecular hydrogen abstraction is a typical reaction of diaryl ketones. Photoinduced electron transfer is a more general process which is not limited to a certain class of compounds.

(2)

Examples of suitable Type I homolytic free-radical photoinitiators are benzoin derivatives, methylolbenzoin and 4-benzoyl-1,3-dioxolane derivatives, benzilketals, $\alpha,\alpha$-dialkoxyacetophenones, $\alpha$-hydroxy alkylphenones, $\alpha$-aminoalkylphenones, acylphosphine oxides, bisacylphosphine oxides, acylphosphine sulphides, halogenated acetophenone derivatives, and the like. Commercial examples of suitable Type I photoinitiators are Irgacure 651 (benzildimethyl ketal or 2,2-dimethoxy-1,2-diphenylethanone, Ciba-Geigy), Irgacure 184 (1-hydroxy-cyclohexyl-phenyl ketone as the active component, Ciba-Geigy), Darocur 1173 (2-hydroxy-2-methyl-1-phenylpropan-1-one as the active component, Ciba-Geigy), Irgacure 907 (2-methyl-1-[4-(methylthio)phenyl]-2-morpholino propan-1-one, Ciba-Geigy), Irgacure 369 (2-benzyl-2-dimethylamino-1-(4-morpholinophenyl)-butan-1-one as the active component, Ciba-Geigy), Esacure KIP 150 (poly {2-hydroxy-2-methyl-1-[4-(1-methylvinyl)phenyl]propan-1-one}, Fratelli Lamberti), Esacure KIP 100 F (blend of poly {2-hydroxy-2-methyl-1-[4-(1-methylvinyl)phenyl]propan-1-one} and 2-hydroxy-2-methyl-1-phenyl-propan-1-one, Fratelli Lamberti), Esacure KTO 46 (blend of poly {2-hydroxy-2-methyl-1-[4-(1-methylvinyl)phenyl]propan-1-one}, 2,4,6-trimethylbenzoyldiphenylphosphine oxide and methylbenzophenone derivatives, Fratelli Lamberti), acylphosphine oxides such as Lucirin TPO (2,4,6-trimethylbenzoyl diphenyl phosphine oxide, BASF), Irgacure 819 (bis (2,4,6-trimethylbenzoyl)-phenyl-phosphine-oxide, Ciba-Geigy), Irgacure 1700 (25:75% blend of bis (2,6-dimethoxybenzoyl)2,4,4-trimethylpentyl phosphine oxide and 2-hydroxy-2-methyl-1-phenyl-propan-1-one, Ciba-Geigy), and the like. Also mixtures of type I photoinitiators can be used. For colored (e.g. pigmented) systems, phosphine oxide type photoinitiators and Irgacure 907 are preferred.

Examples of suitable Type-II (hydrogen abstraction) photoinitiators are aromatic ketones such as benzophenone, xanthone, derivatives of benzophenone (e.g. chlorobenzophenone), blends of benzophenone and benzophenone derivatives (e.g. Photocure 81, a 50/50 blend of 4-methylbenzophenone and benzophenone), Michler's Ketone, Ethyl Michler's Ketone, thioxanthone and other xanthone derivatives like Quantacure ITX (isopropyl thioxanthone), benzil, anthraquinones (e.g. 2-ethyl anthraquinone), coumarin, and the like. Chemical derivatives and combinations of these photoinitiators can also be used.

Type-II photoinitiators generally are used together with an amine synergist. Preferably, the amine synergist is chosen from the group consisting of a monomer tertiary amine compound, an oligomer (polymer) tertiary amine compound, a polymerizable amino acrylate compound, a polymerized amino acrylate compound and mixtures thereof.

The amine-synergist may include tertiary amine compounds, such as alkanol-dialkylamines (e.g., ethanol-diethylamine), alkyldialkanolamines (e.g. methyldiethanolamine), trialkanolamines (e.g. triethanolamine), and ethylenically unsaturated amine-functional compounds including amine-functional polymer compounds, copolymerizable amine acrylates, and the like. The ethylenically unsaturated amine compounds may also include dialkylamino alkyl(meth)acrylates (e.g., diethylaminoethylacrylate) or N-morpholinoalkyl-(meth)acrylates (e.g., N-morpholinoethyl-acrylate).

Preferably, the total amount of photoinitiators present is between about 0.10 wt. % and about 20.0 wt. % relative to the total amount of the coating composition. More preferably, the total amount is at least about 0.5 wt. %, particularly preferred, at least about 1.0 wt. %, and most preferred, at least about 2.0 wt. %. Moreover, the total amount is preferably less than about 15.0 wt. %, more preferably, less than about 10.0 wt. %, and particularly preferred, less than about 6.0 wt. %

Preferably, each of the photoinitiators (Ci) is individually present in an amount of at least about 0.03 wt. %, more preferably, at least about 0.05 wt. %, particularly preferred, at least about 0.1 wt. %, and most preferred, at least about 0.15 wt. %. Further, each photoinitiator (Ci) is individually preferably present in an amount of about 10.0 wt. % or less, more preferably, about 5.0 wt. % or less, particularly preferably, about 4.0 wt. % or less, and most preferred, about 2.5 wt. % or less.

The ratio $C_i$:C of the amount of individual photoinitiator (Ci) to the total amount of photoinitiators (C) preferably is about 50% or less, more preferably about 45% or less, particularly preferred about 40% or less, most preferred about 30% or less. The ratio $C_i$:C preferably is at least about 2%, more preferably at least about 5%, particularly preferred at least about 10%.

It is preferred that at least two of the compounds (Ci) are homolytic free radical photoinitiators, preferably, at least three, more preferably, at least four, particularly preferred all the compounds (Ci) are homolytic free radical photoinitiators. Moreover, it is preferred that at least two of the compounds (Ci) are α-cleavage homolytic free radical photoinitiators, more preferred, at least three, particularly preferred at least four and most preferred, all of the compounds (Ci) are of the α-cleavage type.

In one preferred embodiment of the present invention at least one of the photoinitiators contains a phosphorous, sulfur or nitrogen atom. It is even more preferred that the photoinitiator package comprises at least a combination of a photoinitiator containing a phosphorous atom and a photoinitiator containing a sulfur atom.

In another preferred embodiment of the invention, at least one of the compounds (Ci) is an oligomeric or polymeric photoinitiator. Besides showing an improved cure speed, said coating compositions comprising at least one polymeric photoinitiator (Ci) additionally exhibit, upon cure, improved release properties from another covering layer, such as a matrix or bundling material or any other material applied to the surface of the subject composition.

The oligomeric photoinitiator includes a plurality radiation-absorbing groups that generate radicals upon exposure to radiation. Preferably, the oligomer includes 3 or more, preferably 5-100, radiation-absorbing groups and has a molecular weight of at least 800 g/mol. Specifically, oligomeric photoinitiators can include an aryl group, preferably an arylketone groups.

Suitable oligomeric photoinitiators have a backbone constructed from 2 or more monomeric units, preferably 3 to 50 monomeric units. A monomeric unit of the oligomer can include any of a variety of monomers including styrene, preferably alpha-methyl styrene. The backbone of the oligomeric of the oligomeric backbone may include any suitable polymer units including a polyester, polyether, polycarbonate, polyolefin, polysiloxane and/or polyacrylate units. In particular, the oligomeric photoinitiator can include an oligomer containing a phenyl hydroxyalkyl ketone group, preferably a phenyl alpha-hydroxyalkyl ketone group. For example, the oligomeric photoinitiator can include an oligomer of 2-hydroxy-2-methyl-1-phenyl(4-(1-methylvinyl)phenyl)-1-propanone as well as 2-hydroxy-2-methyl-1-phenyl-1-propanone. The oligomeric photoinitiator can include Esacure KIP 100F, available form Sartomer Corporation.

(D) Additives

An amine compound can be added to the liquid curable resin composition of the present invention to prevent generation of hydrogen gas, which causes transmission loss in the optical fibers. As examples of the amine which can be used here, diallylamine, diisopropylamine, diethylamine, diethylhexylamine, and the like can be given.

In addition to the above-described components, various additives such as antioxidants, UV absorbers, light stabilizers, silane coupling agents, coating surface improvers, heat polymerization inhibitors, leveling agents, surfactants, colorants, preservatives, plasticizers, lubricants, solvents, fillers, aging preventives, and wettability improvers can be used in the liquid curable resin composition of the present invention, as required. Examples of antioxidants include Irganox 1010, 1035, 1076, 1222 (manufactured by Ciba Specialty Chemicals Co., Ltd.), Antigene P, 3C, FR, Sumilizer GA-80 (manufactured by Sumitomo Chemical Industries Co., Ltd.), and the like; examples of UV absorbers include Tinuvin P, 234, 320, 326, 327, 328, 329, 213 (manufactured by Ciba Specialty Chemicals Co., Ltd.), Seesorb 102, 103, 110, 501, 202, 712, 704 (manufactured by Sypro Chemical Co., Ltd.), and the like; examples of light stabilizers include Tinuvin 292, 144, 622LD (manufactured by Ciba Specialty Chemicals Co., Ltd.), Sanol LS770 (manufactured by Sankyo Co., Ltd.), Sumisorb TM-061 (manufactured by Sumitomo Chemical Industries Co., Ltd.), and the like; examples of silane coupling agents include aminopropyltriethoxysilane, mercaptopropyltrimethoxy-silane, and methacryloxypropyltrimethoxysilane, and commercially available products such as SH6062, SH6030 (manufactured by Toray-Dow Corning Silicone Co., Ltd.), and KBE903, KBE603, KBE403 (manufactured by Shin-Etsu Chemical Co., Ltd.); examples of coating surface improvers include silicone additives such as dimethylsiloxane polyether and commercially available products such as DC-57, DC-190 (manufactured by Dow-Corning), SH-28PA, SH-29PA, SH-30PA, SH-190 (manufactured by Toray-Dow Corning Silicone Co., Ltd.), KF351, KF352, KF353, KF354 (manufactured by Shin-Etsu Chemical Co., Ltd.), and L-700, L-7002, L-7500, FK-024-90 (manufactured by Nippon Unicar Co., Ltd.).

The description on radiation curable compositions can also apply to colored compositions, being either a colored single, inner primary, or outer primary composition, an ink composition or a colored matrix or bundling material. The colorant can be a pigment or dye. The pigment can be any pigment suitable for use in pigmented colored optical fiber coatings. Preferably, the pigment is in the form of small particles and is capable of withstanding UV-radiation.

Pigments can be conventional or organic pigments as disclosed in, for example, *Ullman's Encyclopedia of Industrial Chemistry*, 5$^{th}$ Ed., Vol. A22, VCH Publishers (1993), pages 154-155, the complete disclosure of which is hereby fully incorporated by reference. The pigment can be selected based on, for example, whether the composition is a colored secondary, ink coating or matrix material. Ink coatings are typically more heavily pigmented.

General classes of suitable colorants include, among others, inorganic white pigments; black pigments; iron oxides; chronium oxide greens; iron blue and chrome green;

violet pigments; ultramarine pigments; blue, green, yellow, and brown metal combinations; lead chromates and lead molybdates; cadmium pigments; titane pigments; pearlescent pigments; metallic pigments; monoazo pigments, diazo pigments; diazo condensation pigments; quinacridone pigments, dioxazine violet pigment; vat pigments; perylene pigments; thioindigo pigments; phthalocyanine pigments; and tetrachloroindolinones; azo dyes; anthraquinone dyes; xanthene dyes; and azine dyes. Fluorescent pigments can also be used.

Preferably, the pigment has a mean particle size of not more than about 1 μm. The particle size of the commercial pigments can be lowered by milling if necessary. The pigment is preferably present in an amount of about 1 to about 10% by weight, and more preferably in an amount of about 3 to about 8% by weight.

Instead of pigments also dyes can be used if sufficiently color stable. Reactive dyes are particularly preferred. Suitable dyes include polymethine dyes, di and triarylmethine dyes, aza analogues of diarylmethine dyes, aza (18) annulenes (or natural dyes), nitro and nitroso dyes, aza dyes, anthraquinone dyes and sulfur dyes. These dyes are well known in the art.

All these additives may be added to the compositions according to the invention in an amount that is usual for the additive when used in optical fiber coatings.

Physical Characteristics

The viscosity of the liquid curable resin composition of the present invention is usually in the range from about 200 to about 20,000 cP, and preferably from about 2,000 to about 15,000

The radiation curable composition of the present invention may be formulated to be used as a single coating, an inner primary coating, outer primary coating, a matrix material or bundling material (all of which can be colored or not), or as an ink. In particular, the radiation-curable compositions of the present invention may be formulated such that the composition after cure has a modulus as low as 0.1 MPa and as high as 2,000 MPa or more. Those having a modulus in the lower range, for instance, from 0.1 to 10 MPa, preferably 0.1 to 5 MPa, and more preferably 0.5 to less than 3 MPa are typically suitable for inner primary coatings for fiber optics. In contrast, suitable compositions for outer primary coatings, inks and matrix materials generally have a modulus of above 50 MPa, with outer primary coatings tending to have a modulus more particularly above 100 up to 1,000 MPa and matrix materials tending to be more particularly between about 50 MPa to about 200 MPa for soft matrix materials, and between 200 to about 1500 MPa for hard matrix materials. The radiation-curable composition of the present invention may be formulated such that the composition after cure has a Tg between −70° C. and 30° C. The Tg is measured as the peak tan-delta in a DMA curve at 2.5% elongation.

Elongation and tensile strength of these materials can also be optimized depending on the design criteria for a particular use. For cured coatings formed from radiation-curable compositions formulated for use as inner primary coatings on optical fibers, the elongation-at-break is typically greater than 65%, preferably greater than 80%, more preferably the elongation-at-break is at least 110%, more preferably at least 150% but not typically higher than 400%. For coatings formulated for outer primary coatings, inks and matrix materials the elongation-at-break is typically between 6% and 100%, and preferably higher than 10%.

The glass transition temperature (Tg), measured as the peak tan-delta determined by dynamic mechanical analysis (DMA), can be optimized depending on the particulars of the application. The glass transition temperature may be from 10° C. down to −70° C. or lower, more preferably lower than 0° C. for compositions formulated for use as inner primary coatings and 10° C. to 120° C. or higher, more preferably above 30° C., for compositions designed for use as outer primary coatings, inks and matrix materials.

A radiation-curable composition according to the present invention that comprises at least three photoinitiators preferably cures faster than a comparable composition, said comparable composition being identical to said radiation-curable composition except that said at least three photoinitiators in said radiation-curable composition have been replaced in said comparable composition with an equal weight amount of 1-hydroxy-cyclohexyl-phenyl ketone photoinitiator. Preferably, the ratio of percentage reacted acrylate unsaturation of the present radiation-curable composition to the percentage reacted acrylate unsaturation of the comparable composition, when both compositions are cured at a dose of 4.4 mJ/cm$^2$, is at least 1.1, more preferably at least 1.2, and most preferably at least 1.3.

EXAMPLES

The following examples are given as particular embodiments of the invention and to demonstrate the practice and advantages thereof. The examples are given by way of illustration and are not intended to limit the specification or claims.

Radiation-curable coating compositions were prepared from a mixture of components shown in Tables 1, 2, 4, 5, and 6. These components are described below:

Oligomer 1 is a polyether based urethane acrylate

Oligomer 2 is a polyester based urethane acrylate

Oligomer 3 is an epoxy acrylate oligomer

Oligomer 4 is an alkyd based urethane acrylate

Oligomer 5 is an aliphatic polyether-polycarbonate based urethane acrylate oligomer, having a Mw of 4000, which is derived from 2-hydroxyethylacrylate, isophoronediisocyanate, and equal amounts of polypropyleneglycol diol and a copolymer diol of 10-15 wt % polyether/85-90 wt % polycarbonate.

Oligomer 6 is an aliphatic polyether-polycarbonate based urethane acrylate having a Mw of 3000 that is derived from the same components as oligomer 5.

Oligomer 7 is an aliphatic polyether based urethane acrylate oligomer which is derived from polytetrahydrofuran polyol, the trimer of hexamethylene diisocyanate (commercially available as Desmodur N), and hydroxyethyl acrylate.

Oligomer 8 is Photomer 6008, available from Henkel Corp. Photomer 6008 is an aliphatic polyether urethane acrylate oligomer having a polypropylene glycol backbone.

Oligomer 9 is Photomer 6010, available from Henkel Corp. Photomer 6010 is an aliphatic polyether urethane acrylate oligomer (Mw about 1,500 g/mol) derived from polytetrahydrofuran polyol, methylene bis (4-cyclohexyl isocyanate) [commercially available as Desmodur W], and hydroxyethylacrylate.

Cyclic monoacrylate 1 is an alkoxylated cyclic monoacrylate reactive diluent.

Cyclic monoacrylate 2 is a cyclic monoacrylate reactive diluent.

Lucirin TPO is 2,4,6-trimethylbenzoyl diphenyl phosphine oxide, available from BASF.

Irgacure 819 is bis (2,4,6-trimethylbenzoyl)-phenyl-phosphine-oxide, available from Ciba-Geigy.
Irgacure 184 is 1-hydroxy-cyclohexyl-phenyl ketone, available from Ciba-Geigy.
Darocur 1173 is 2-hydroxy-2-methyl-1-phenylpropan-1-one, available from Ciba-Geigy.
Irgacure 907 is 2-methyl-1-[4-(methylthio)phenyl]-2-morpholino propan-1-one, available from Ciba-Geigy.
Irgacure 1700 is a 25:75% blend of bis (2,6-dimethoxybenzoyl)2,4,4-trimethylpentyl phosphine oxide and 2-hydroxy-2-methyl-1-phenyl-propan-1-one, available from Ciba-Geigy.
Irganox 1035 is thiodiethylene bis-(3,5-di-tertiary-butyl -4-hydroxy) hydrocinnamate.
Tinuvin 622 is dimethyl succinate polymer with 4-hydroxy-2,2,6,6-tetramethyl-1-piperidine ethanol.
A-189 is 1-propanethiol,3-(trimethoxysilyl).
A-1110 is 3-aminopropyltrimethoxysilane stabilizer, from OSi Specialties, Inc., Danbury, Conn.
The Test methods used will be described below.

TABLE 1

Outer primary coating compositions:

| | Ex. 1 Wt. % | Ex. 2 Wt. % | Comp. Exp. A Wt. % |
|---|---|---|---|
| Components | | | |
| Oligomer 1 | 34.8 | 34.8 | 34.17 |
| Diacrylate diluent | 55.0 | 55.0 | 56.00 |
| Monoacrylate diluent | 6.2 | 6.2 | 6.09 |
| Photoinitiators | | | |
| Lucirin TPO | 0.5 | 1.0 | 1.07 |
| Irgacure 819 | 0.5 | 0.25 | — |
| Irgacure 184 | 1.0 | 1.0 | 2.14 |
| Darocur 1173 | 1.0 | 2.0 | — |
| Irgacure 907 | 0.5 | 0.25 | — |
| Irganox 1035 | 0.5 | 0.5 | 0.53 |
| Properties | | | |
| Viscosity (mPa · s) | 6100 | 6300 | 6400 |
| % RAU (4.4 mJ/cm$^2$) | 67 | 69 | 55 |
| % RAU (2.9 mJ/cm$^2$) | 56.7 | 62.2 | 48.5 |
| Tensile strength (MPa) | 31 | 35 | 33 |
| Elongation (%) | 13 | 18 | 10 |
| Modulus (MPa) | 810 | 880 | 850 |
| T $_{\tan \delta \max}$ (° C.) | 75 | 75 | 77 |
| E$_o$ (MPa) | 36 | 37 | 39 |
| Fluoresc Yellowing ΔE | 15 | 7.5 | 6.5 |
| 125° C. yellowing ΔE | 70 | 69 | 69 |
| 85° C. yellowing ΔE | 15 | 10 | 7.5 |
| 85/85 yellowing ΔE | 25 | 25.5 | 24 |

As can be seen from Table 1, the outer primary coating compositions of the present invention have a % RAU of at least 5% higher than the outer primary coating control composition exemplified in Comparative Experiment A, when the compositions are exposed to a dose of 4.4 mJ/cm$^2$. Preferably, when the compositions are exposed to a dose of 4.4 mJ/cm$^2$, the % RAU of the compositions of the invention is at least 10% higher than the control composition exemplified in Comp. Exp. A, more preferably, at least 15%, particularly preferred, at least 22%.

When exposed to a dose of about 2.9 mJ/cm$^2$, the compositions of the present invention have a % RAU of at least 5% higher than the control composition exemplified in Comparative Experiment A. Preferably, when exposed to a dose of about 2.9 mJ/cm$^2$, the % RAU of the present invention are at least 10% higher, more preferred, at least 15% higher, and particularly preferred, at least 17% higher than the % RAU of the Comp. Exp. A.

TABLE 2

Outer primary coating compositions:

| | Ex. 3 Wt. % | Comp. Exp. A Wt. % |
|---|---|---|
| Components | | |
| Oligomer 1 | — | 34.17 |
| Oligomer 2 | 37.99 | — |
| Oligomer 3 | 28.5 | — |
| Diacrylate diluent | 10.45 | 56.00 |
| Monoacrylate diluent | 10.45 | 6.09 |
| Vinyl monomer | 4.47 | — |
| Photoinitiators | | |
| Lucirin TPO | 1.90 | 1.07 |
| Irgacure 819 | — | — |
| Irgacure 184 | 0.95 | 2.14 |
| Darocur 1173 | — | — |
| Irgacure 907 | — | — |
| Esacure KIP 100F | 5.00 | — |
| Irganox 1035 | 0.29 | 0.53 |
| Properties | | |
| % RAU (4.4 mJ/cm$^2$) | 65.6 | 55 |
| % RAU (2.9 mJ/cm$^2$) | 50.8 | 48.5 |

TABLE 3

ε of photoinitiator packages

| 280–320 nm | Ex. 1 | Ex. 2 | Ex. 3 | Comp. Exp. A |
|---|---|---|---|---|
| Minimum ε | 2646 | 1136 | 1055 | 522 |
| Average ε | 3462 | 1663 | 3173 | 973 |

Table 3 shows the minimum and average extinction coefficients ε (in 1 mol$^{-1}$cm$^{-1}$) between 280 and 320 nm of the absorption spectra in methanol of the photoinitiator packages of the outer primary coating compositions of Ex. 1, 2, 3 and Comparative Experiment A respectively.

FIG. 1 gives the absorption spectra in methanol of the photoinitiator packages of the outer primary coating compositions of Ex. 1 and 2 and Comparative Experiment A respectively. This FIG. 1 clearly shows for the photoinitiator packages according to the invention a peak or shoulder in the absorption spectra in the range between 280 and 320 nm.

Figure 2:
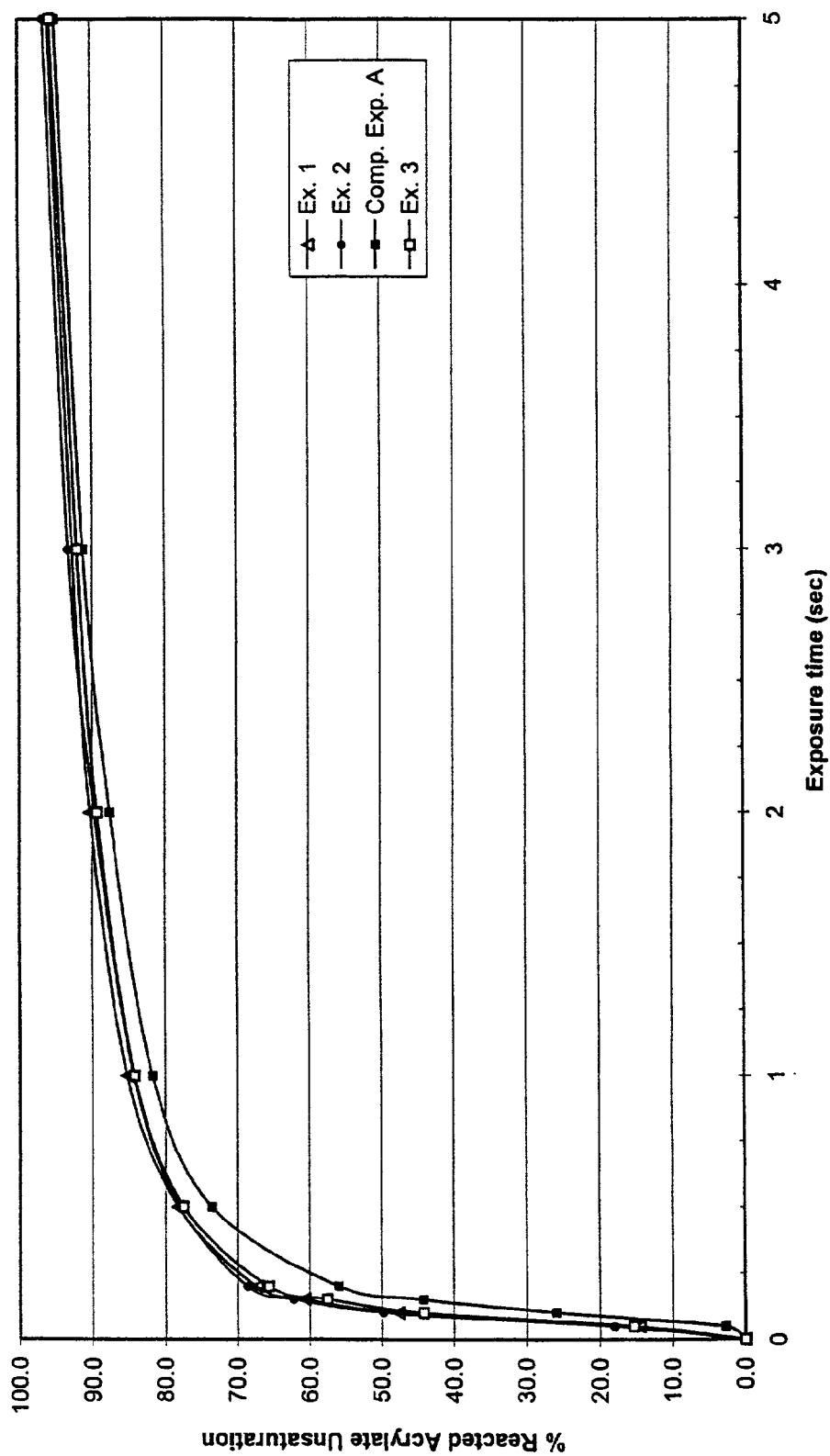
FIG. 2 shows a graph of % Reacted Acrylate Unsaturation versus Exposure time.

FIG. 2 shows the FTIR cure behavior of the radiation curable compositions of Examples 1, 2 and 3 and of Comparative Experiment A. These FTIR cure curves give the % RAU (Reacted Acrylate Conversion) versus the UV-light exposure time. FIG. 2 clearly demonstrates that the compositions of the present invention are faster curing than the prior art (Comp. Exp. A), in particular, after very short exposure times. This is clear from the much steeper initial slopes of the FTIR curves compared with Comp. Exp. A.

TABLE 4

Outer primary coating composition

| | Ex. 4 Wt. % |
|---|---|
| Components | |
| Oligomer 1 | 34.80 |
| Diacrylate diluent | 52.00 |
| Monoacrylate diluent | 6.20 |
| Vinyl monomer | 3.00 |
| Photoinitiators | |
| Lucirin TPO | 1.00 |
| Irgacure 819 | 0.25 |
| Irgacure 184 | 1.00 |
| Darocur 1173 | 2.00 |
| Irgacure 907 | 0.25 |
| Irganox 1035 | 0.50 |
| Properties | |
| Viscosity (mPa · s) | 5000 |
| Tensile strength (MPa) | 29 |
| Elongation (%) | 19.5 |
| Modulus (MPa) | 820 |

The outer primary coating composition of Example 4 has an increase in cure speed of 80% compared to the outer primary coating composition of Comparative Experiment A.

TABLE 5

Outer primary coating compositions:

| | Ex. 5 Wt. % | Ex. 6 Wt. % | Comp. Exp. B Wt. % |
|---|---|---|---|
| Components | | | |
| Oligomer 4 | 69.50 | 68.30 | 69.80 |
| Vinyl monomer | 5.30 | 5.30 | 5.29 |
| Diacrylate diluent | 4.00 | 4.00 | 4.00 |
| Cyclic monoacrylate 1 | 4.00 | 4.00 | 4.00 |
| Cyclic monoacrylate 2 | 13.20 | 13.15 | 13.20 |
| Photoinitiators | | | |
| Lucirin TPO | 0.50 | 1.00 | 1.07 |
| Irgacure 819 | 0.50 | 0.25 | — |
| Irgacure 184 | 1.00 | 1.00 | 2.14 |
| Darocur 1173 | 1.00 | 2.00 | — |
| Irgacure 907 | 0.50 | 0.50 | — |
| Irganox 1035 | 0.50 | 0.50 | 0.50 |
| Properties | | | |
| % RAU (4.4 mJ/cm$^2$) | 57.4 | 58.9 | 50.4 |
| % RAU (2.9 mJ/cm$^2$) | 43.0 | 44.0 | 33.0 |

TABLE 6

Inner primary coating compositions:

| | Ex. 7 Wt. % | Ex. 8 Wt. % | Comp. Exp. C Wt. % |
|---|---|---|---|
| Components | | | |
| Oligomer 5 | — | — | 50.0 |
| Oligomer 6 | 47.88 | 49.98 | — |
| Vinyl caprolactam | — | 5.0 | — |
| isodecyl acrylate | — | — | 12.5 |
| ethoxylated bisphenol A diacrylate | — | — | 0.1 |
| ethoxylated (n = 4) nonyl phenol acrylate | 46.02 | 38.92 | 31.0 |
| Photoinitiators | | | |
| Irgacure 1700 | 3.0 | 3.0 | 3.0 |
| Irgacure 184 | 2.0 | 2.0 | 2.0 |
| A-189 adhesion promotor | 0.9 | 0.9 | 0.9 |
| Irganox 1035 | 0.25 | 0.25 | 0.5 |
| Tinuvin 622 | 0.10 | 0.10 | — |
| Properties | | | |
| Viscosity (mPa · s) | 5100 | 3100 | 5100 |
| % RAU (4.4 mJ/cm$^2$) | 67.0 | 82.1 | 52.2 |
| % RAU (2.9 mJ/cm$^2$) | 60 | 42 | 25 |
| Tensile strength (MPa) | 0.5 | 0.6 | 0.5 |
| Elongation (%) | 99 | 95 | 80 |
| Modulus (MPa) | 1.1 | 1.2 | 1.2 |
| ΔE after 8 wks under fluorescent light | 6.0 | 8.5 | 33.0 |

TABLE 7

Inner primary compositions

| | Comp. Ex. D wt % | Ex. 9 wt % | Ex. 10 wt % |
|---|---|---|---|
| Components | | | |
| Oligomer 7 | 56.00 | 56.00 | 56.00 |
| Propoxylated nonyl phenol acrylate | 36.50 | 37.50 | 38.00 |
| Irgacure 184 | 6.00 | 2.00 | 2.00 |
| Irgacure 1700 | — | 3.00 | — |
| Lucirin TPO | — | — | 0.50 |
| Darocur 1173 | — | — | 2.00 |
| Irganox 1035 | 1.00 | 1.00 | 1.00 |
| A-189 | 0.49 | 0.49 | 0.49 |
| A-1110 | 0.01 | 0.01 | 0.01 |
| Properties | | | |
| Clarity | Clear | Sl. Hazy | Clear |
| Color (Gardner) | 1 | 4 | 1 |
| Visc. @ 25° C. (mPa · s) | 29,100 | 32,500 | 25,700 |
| Tensile.Strength (MPa) | 1.9 | 2.4 | 3.0 |
| Elongation (%) | 182 | 197 | 224 |
| Modulus (mPa) | 2.30 | 2.38 | 2.29 |
| % RAU (4.4 mJ/cm$^2$) | 58.3 | 71.3 | 67.9 |

TABLE 8

Outer Primary Coatings

| | Comp. Ex. E wt % | Ex. 11 wt % | Ex. 12 wt % |
|---|---|---|---|
| Components | | | |
| Oligomer 8 | 35.00 | 35.00 | 35.00 |
| Oligomer 9 | 35.00 | 35.00 | 35.00 |
| Hexane diol diacrylate | 24.995 | 24.495 | 25.995 |
| Irgacure 184 | 4.00 | 1.00 | 1.00 |
| Lucirin TPO | — | 1.00 | 0.70 |
| Irgacure 819 | — | 0.25 | 0.30 |
| Darocur 1173 | — | 2.00 | 1.00 |

TABLE 8-continued

Outer Primary Coatings

|  | Comp. Ex. E wt % | Ex. 11 wt % | Ex. 12 wt % |
| --- | --- | --- | --- |
| Irgacure 907 | — | 0.25 | — |
| Irganox 1035 | 1.00 | 1.00 | 1.00 |
| DC 57 | 0.005 | 0.005 | 0.005 |
| Properties |  |  |  |
| Clarity | Clear | Clear | Clear |
| Color (Gardner) | 1 | 4 | 4 |
| Visc. @ 25° C. (mPa · s) | 6010 | 5820 | 5630 |
| Tens. Str. (MPa) | 30 | 30 | 33 |
| Elongation (%) | 10 | 13 | 16 |
| Modulus (MPa) | 715 | 707 | 746 |
| 95% Cure (J/cm$^2$) | 0.40 | 0.32 | 0.30 |
| % RAU (4.4 mJ/cm$^2$) | 50.9 | 73.2 | 66.8 |

Test Procedures

Cure Speed FTIR Test (% RAU)

The relative cure rates for ultraviolet cured coatings can be determined using FTIR transmission techniques. The method is applicable to coating systems that cure by loss of double bonds when exposed to ultraviolet light.

Equipment:

A Fourier transform infrared (FTIR) spectrophotometer, Nicolet 60SX or equivalent instrument is used. Instrument parameters are: TGS detector, 4 cm$^{-1}$ resolution and ten scans are co-added for each spectrum.

Infrared spectrometry is now well known and any infrared spectrometer can be utilized to obtain the infrared spectrum.

A Mercury UV lamp, 100 W, Oriel Corp. #6281 or equivalent is used. Alternative UV lamp systems capable of producing controlled short pulses of radiation may be substituted.

Sample Preparation:

A Teflon spacer is placed onto the surface of a clean NaCl transmission window. By using a tip of a disposable glass pipette, a small drop of thoroughly mixed coating is placed in the center of the NaCl disc. A second NaCl disc is placed carefully on top of the drop of coating such that the coating spreads evenly to the edge of the spacer and such that no air bubbles are present in the coating.

Instrument Set-up/Standardization:

The UV lamp is turned on, then the FTIR is turned on. A background spectrum is collected with no sample in the IR beam path.

Procedure for Analyzing Samples:

For a first analysis of a coating system a standard procedure is followed to ensure that the coating thickness is constant for any one coating system. A 50 micron spacer is used for achieving a constant thickness. Therefore, the net absorbance of the unsaturation band from the peak minimum to the peak maximum is measured. The peak maximum should be in the 1.0 to 1.2 A range. The net absorbance will depend on the peak minimum. For coatings based on acrylate chemistry, the acrylate unsaturation band at 810 cm$^{-1}$ and a baseline at the minimum near 795 cm$^{-1}$ is used. This step is repeated three times and the average of the three absorbance values is taken as the net absorbance. This averaged value is used as a target absorbance for all future analyses of that particular coating system. This value is likely to differ for each coating system due to the differences in unsaturation content. The coating thickness is then adjusted by tightening the demountable cell holder screws until the net absorbance of the unsaturation band is within ±0.05 A of the above described averaged value for the net absorbance. Spectra are collected, one right after another, until the net absorbance value stabilizes (the coating may take a few minutes to reach equilibrium).

Then, an infrared spectrum of the uncured, liquid sample and an infrared spectrum of the cured sample are obtained by varying the exposure times between 0.05 and 5 seconds. Exposure times may vary depending on the coating system, for example, fast curing coating systems require shorter exposure times.

Figure 3:
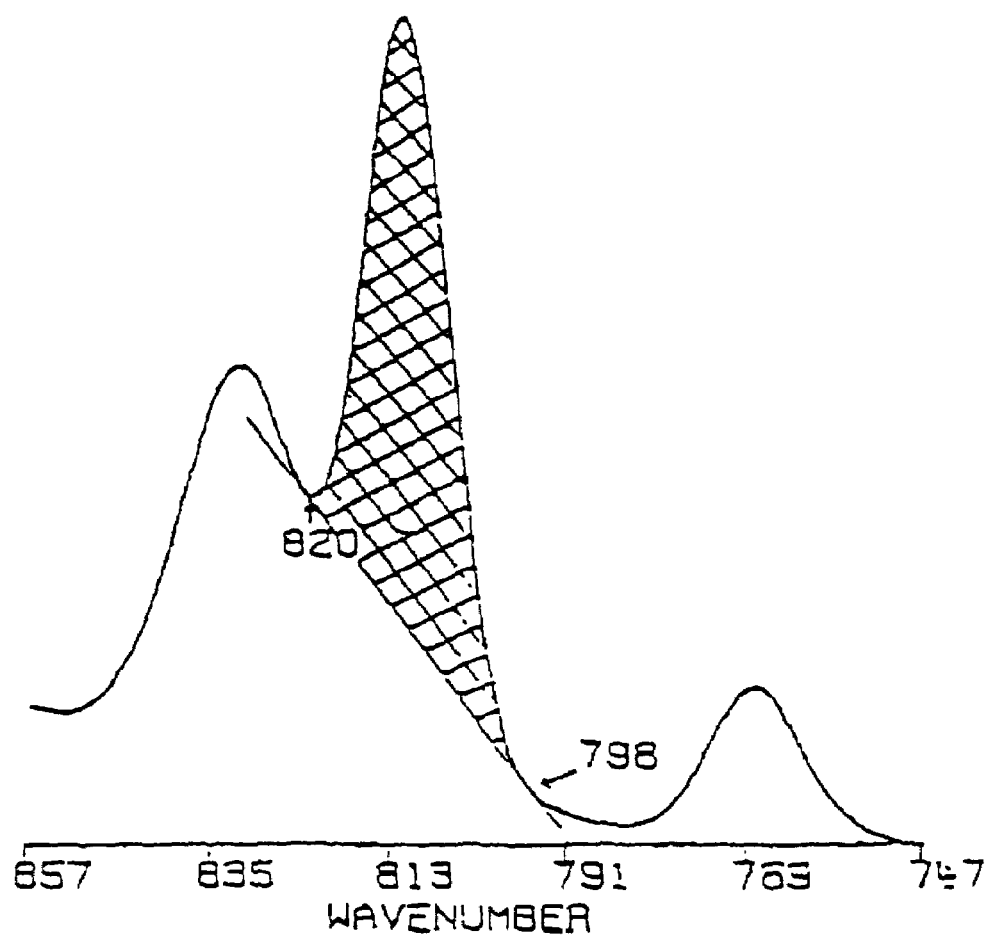
FIG. 3 shows a representation of the baseline technique.

The net peak area of the acrylate unsaturation absorbance for the uncured liquid sample is measured. For most acrylate-based coatings, the absorbance at about 810 cm$^{-1}$ should be used. However, if the coating contains a siloxane or other component which absorbs strongly at or near 810 cm$^{-1}$, an alternative acrylate absorbance peak can be used. The absorbances at about 1410 cm$^{-1}$ and about 1635 cm$^{-1}$ have been found to be satisfactory. The net peak area can be measured using the well known baseline technique in which a baseline is drawn tangent to absorbance minima on either side of the peak. The area above the baseline and under the peak is the net peak area. FIG. 3 gives a representation of the baseline technique and shows how the net area under the unsaturation band is determined.

A reference area is then determined. The reference absorbance should not change in intensity as the liquid sample is cured. Many formulations have an absorbance in the range of about 780 to about 750 cm$^{-1}$ that can be used as a reference absorbance. The net peak area of the reference absorbance is measured. Both sample and reference are measured in triplicate for each exposure time.

Calculations:

The ratio of the acrylate absorbance to the reference absorbance for the uncured, liquid sample is determined using the following formula:

$$R_L = A_{AL}/A_{RL}$$

where $A_{AL}$ is the net peak area of the acrylate absorbance (under the acrylate band), $A_{RL}$ is the net peak area of the reference absorbance, and $R_L$ is the area ratio for the liquid sample.

The ratio of the acrylate absorbance to the reference absorbance for the cured sample is determined using the following formula:

$$R_C = A_{AC}/A_{RC}$$

where $A_{AC}$ is the net peak area of the acrylate absorbance, $A_{RC}$ is the net peak area of the reference absorbance, and $R_C$ is the area ratio for the cured sample.

The degree of cure as a percent reacted acrylate unsaturation (% RAU) is determined using the following formula:

$$\% RAU = [(R_L - R_C) \times 100\%]/R_L$$

The average % RAU is determined for the triplicate analyses for each time exposure for both sample and reference. The time of exposure are then plotted versus % RAU for both sample and reference.

The precision of the data used to obtain the exposure time versus % RAU plot varies over the course of the plot. At exposure times where the curve is not steep, values ±2% (absolute) of the average value are acceptable. At exposure Yellowing Tests:

The color aging behavior (delta E) of the cured films was measured by conventional methods as disclosed in the publication entitled "A Measurement of the Contribution of UV Cured Coatings and Ink Binders Towards Color Change of UV Cured Inks" by D. M. Szum in Radtech Europe '93 Conference Proceedings (papers presented at the Radtech Europe Conference held May 2-6, 1993), the complete disclosure of which is hereby incorporated by reference. This publication discloses measurements which were performed on three layer samples, whereas the samples of the present invention were single layers. The measurement involves a mathematical manipulation, FMC-2.

Yellowing measurements were carried out with film samples about 2×2 inches square. Color measurement data was obtained from a Macbeth Color Eye 7000-A. The calorimeter was calibrated and set to the following parameters:

Illuminant: D65
Color Difference: CIElab
Mode: Reflectance
Area of Measurement: Large Area View
Specular Component: Included (SCI)
UV filter: Included
Observer: 10 degrees
Background: White calibration standard Delta E (ΔE) Over Time i) Under Low Intensity Fluorescent Light:

Evaluation of ΔE for inner primary coatings:

The ΔE value provides an indication of how stable the color of the subject composition is. The ΔE low intensity fluorescent test uses a three sample average, all measured on glass, prepared by curing a 500 microns thick radiation-curable composition of the present invention, formulated as an inner primary coating, on glass at 1.0 J/cm² under 0.2 m³/min of $N_2$. Then, a 75 microns thick standard outer primary coating of Comp. Exp. A was cured over the inner primary coating at the same conditions. Low intensity fluorescent light aging is done in a non-temperature-controlled room, under six eight foot long, 60 watt Phillips Econ-O-Watt fluorescent bulbs located approximately 3 meters from the samples.

Weekly delta E (ΔE) values (degree of color change) were measured on a Mac Beth Color Eye 7000-A with parameters set as described above.

The ΔE values given in Tables 1 and 3 are the values taken after 8 weeks storing under low intensity fluorescent light.

Evaluation of ΔE for outer primary coatings:

Same test conditions as described above for inner primary coatings, but sample was prepared by curing a 500 microns thick radiation-curable composition of the present invention, formulated as an outer primary coating, on glass at 1.0 J/cm² under 0.2 m³/min of $N_2$.

ii) Under 125° C.:

The ΔE values were taken after 8 weeks storing of the samples at a temperature of 125° C. Sample preparations and test conditions are the same as described under i).

iii) Under 85° C.:

The ΔE values were measured after 8 weeks storing of the samples at a temperature of 85° C. Sample preparations and test conditions are the same as described under i).

iv) Under 85% RH and 85° C.:

The ΔE values were measured after 8 weeks storing of the samples under 85% relative humidity and at a temperature of 85° C. Sample preparations and test conditions are the same as described under i).

Absorption Spectra

The UV spectrophotometer is a Perkin-Elmer Lambda 9. The samples of photoinitiators were run as solutions in methanol at different concentrations. Example 1 at a concentration of $1.51 \times 10^{-4}$, Example 2 at a concentration of $3.33 \times 10^{-4}$, Example 3 at a concentration of $1.41 \times 10^{-4}$, and Comparative Experiment A at a concentration of $3.24 \times 10^{-4}$. All samples were run in 1.0 cm quartz cells with methanol in the reference beam. The scan speed was 120 nm/min and the slit width was 5 μm. The absorption spectra are given as an absorbance versus wavelength λ and derived from the absorbance A are the spectra of the molar extinction coefficient ε versus wavelength λ.

The molar extinction coefficient ε is a characteristic of each compound and is a constant value for a compound at a certain wavelength. The extinction coefficients were calculated from the absorbance at a certain wavelength of the absorption spectra of the photoinitiator packages in methanol. This was calculated from the Lambert-Beer law. Lambert's law states that the fraction of the incident light absorbed is independent of the intensity of the source. Beer's law states that the absorption is proportional to the number of absorbing molecules. From these laws the remaining variables give the Lambert-Beer law:

$$\log_{10} I_0/I = \epsilon \cdot c \cdot l = A$$

$I_0$ and $I$ are the intensities of the incident and transmitted light respectively, l is the path length of the absorbing solution in centimeters, and c is the concentration in moles/litre. $\log_{10} I_0/I$ is called the absorbance or optical density.

Throughout the description, the absorption spectra and characteristics are defined by ε, λmax and absorbance. The wavelength λmax defines a wavelength at which a maximum in the absorbance is reached.

FIG. 1 gives the absorption spectra in methanol of the photoinitiator packages of Ex. 1 and 2 and Comparative Experiment A respectively. In particular, the extinction coefficient (which is calculated from the absorbance as described above) is plotted versus the wavelength. The extinction coefficient is independent from the concentration of the sample.

What is claimed is:

1. A radiation-curable composition comprising:
   (a) an acrylate oligomer having a polyether backbone;
   (b) an acrylate monomer; and
   (c) at least three photoinitiators,
   wherein said oligomer is derived from, relative to the total weight of the oligomer:
   (i) 10-30 wt % of isophorone diisocyanate;
   (ii) 5-15 wt % of dicyclohexylmethane diisocyanate;
   (iii) 45-75 wt % of polytetramethylene glycol; and
   (iv) 5-20 wt % of hydroxyethylacrylate.

2. The radiation-curable composition of claim 1, wherein said composition further comprises propoxylated nonyl phenol acrylate.

3. A radiation curable composition comprising:
   (a) an oligomer derived from, relative to the weight of the oligomer:
      (i) 10-30 wt % of isophorone diisocyanate;
      (ii) 5-15 wt % of dicyclohexylmethane diisocyanate;

(iii) 45-75 wt % of polytetramethylene glycol; and
(iv) 5-20 wt % of hydroxyethylacrylate;
(b) an alkoxylated alkyl substituted phenol acrylate;
(c) a photoinitiator; and
(d) a silane coupling agent;
wherein said composition, when cured at a dose of about 4.4 mJ/cm$^2$, has a percentage reacted acrylate unsaturation of at least 60%.

4. The radiation-curable composition of claim 3, wherein said radiation-curable composition, when cured at a dose of about 4.4 mJ/cm$^2$, has a percentage reacted acrylate unsaturation of at least 66%.

5. A radiation curable composition comprising:
(a) an oligomer is derived from, relative to the total weight of said oligomer:
(i) 25-35 wt % of isophorone diisocyanate and/or dicyclohexylmethane diisocyanate;
(ii) 25-40 wt % of polytetramethylene glycol;
(iii) 15-30 wt % of hydroxyethylacrylate;
(iv) 5-15 wt % of hexane diol; and
(v) 5-15 wt % of adipic acid;
(b) hexanediol di(meth)acrylate; and
(c) a photoinitiator;
wherein said radiation-curable composition, when cured at a dose of about 4.4 mJ/cm$^2$, has a percentage reacted acrylate unsaturation of at least 56%.

6. The composition of claim 5, further comprising a polydimethyl siloxane compound.

7. The radiation-curable composition of claim 5, wherein said radiation-curable composition, when cured at a dose of about 4.4 mJ/cm$^2$, has a percentage reacted acrylate unsaturation of at least 60%.

8. The radiation-curable composition of claim 5, wherein said radiation-curable composition, when cured at a dose of about 4.4 mJ/cm$^2$, has a percentage reacted acrylate unsaturation of at least 66%.

9. The radiation-curable composition of claim 5, wherein said composition is an outer primary coating composition for optical fibers.

10. The radiation-curable composition of claim 5, wherein said oligomer comprises a polyether oligomer and a polyester oligomer.

11. A radiation-curable composition comprising
(A) an oligomer,
(B) a reactive diluent, and
(C) a photoinitiator package of at least two free radical photoinitiators having an overall absorption spectrum in methanol which is the sum of the absorption spectra of each individual photoinitiator wherein said overall absorption spectrum has a minimum value of a molar extinction coefficient ($\epsilon$) in a range between 280 nm ($\lambda_1$) and 320 nm ($\lambda_2$) of at least about 525 lmol$^{-1}$cm$^{-1}$ or wherein said overall absorption spectrum has an average value of $\epsilon$ in a range between 280 nm ($\lambda_1$) and 320 nm ($\lambda_2$) of at least about 980 lmol$^{-1}$cm$^{-1}$.

12. A radiation-curable composition according to claim 11 wherein the overall absorption spectrum in methanol of the photoinitiators in the range between 280 nm ($\lambda_1$) and 320 nm ($\lambda_2$), has a minimum value of s of at least about 600 lmol$^{-1}$cm$^{-1}$ or an average value of $\epsilon$ of at least about 1200 lmol$^{-1}$cm$^{-1}$.

13. A radiation-curable composition according to claim 11, wherein the overall absorption spectrum of the photoinitiator package shows a peak or shoulder in the range between 280 and 320 nm.

14. A radiation-curable composition according to claim 11, wherein at least one of the photoinitiators contains a phosphorous, sulfur or nitrogen atom.

15. A radiation-curable composition according to claim 11, wherein the photoinitiator package comprises at least a combination of a photoinitiator containing a phosphorous atom and a photoinitiator containing a sulfur atom.

16. A radiation-curable coating composition according to claim 11, wherein the total amount of compound (C) is between about 0.10 and about 20.0 wt. % relative to the total amount of the coating composition.

17. A radiation-curable coating composition according to claim 11, wherein the photoinitiators are each individually present in an amount between about 0.03 and about 10.0 wt. % relative to the total amount of the coating composition.

18. A radiation-curable coating composition according to claim 17 wherein each photoinitiator is present in an amount between about 0.05 wt. % and about 4.0 wt. %.

19. A radiation-curable coating composition according to claim 11, wherein the photoinitiators are free radical photoinitiators.

20. A radiation-curable coating composition according to claim 19 wherein at least two of the photoinitiators are homolytic free radical photoinitiators.

21. A radiation-curable coating composition according to claim 19 wherein at least two of the photoinitiators are α-cleavage homolytic free radical photoinitiators.

22. A radiation-curable coating composition according to claim 21 wherein component (C) comprises at least a combination of a photoinitiator containing a phosphorus atom and a photoinitiator containing a sulfur atom.

23. A radiation-curable coating composition according to claim 22 wherein at least one of the photoinitiators is oligomeric.

24. A radiation-curable coating composition according to claim 11, wherein compound (C) comprises five different α-cleavage homolytic free radical photoinitiators, wherein each photoinitiator is individually present in an amount between 0.05 and 4.0 wt. % relative to the total amount of the coating composition.

25. A radiation-curable coating composition according to claim 24 wherein each photoinitiator is present in an amount between 0.1 and 2.5 wt. % relative to the total amount of the coating composition.

26. A radiation-curable coating composition according to claim 11, wherein component (A) is a urethane (meth) acrylate oligomer.

27. A radiation-curable coating composition according to claim 11, wherein the coating, when cured, is an inner primary coating.

28. A radiation-curable coating composition according to claim 27, wherein the composition is colored.

29. A radiation-curable coating composition according to claim 11, wherein the coating, when cured, is an outer primary coating.

30. A radiation-curable coating composition according to claim 11, wherein the coating, when cured, is matrix or bundling material.

31. A cured coating derived from a composition according to claim 11, wherein the composition is cured with a lamp having at least 6% of its emission in the range between 280 and 320 nm.

32. The composition of claim 11, wherein said composition, when cured at a dose of about 4.4 mJ/cm$^2$, has a percentage reacted acrylate unsaturation of at least 56%.

33. The composition of claim 11, wherein said composition, when cured at a dose of about 4.4 mJ/cm$^2$, has a percentage reacted acrylate unsaturation of at least 60%.

34. The composition of claim 11, wherein said composition, when cured at a dose of about 4.4 mJ/cm$^2$, has a percentage reacted acrylate unsaturation of at least 66%.

35. A radiation-curable composition comprising:
   (A) an oligomer;
   (B) a reactive diluent, and;
   (C) at least three free radical photoinitiators wherein
      (i) at least one of the photoinitiators has an absorption spectrum in acetonitrile having a difference between two absorption maxima in the range between 240 and 360 nm of at least about 15 nm, and wherein
      (ii) considering at least two of the photoinitiators (1 and 2), the difference between the absorption maximum of the absorption spectrum in acetonitrile of photoinitiator 1 and the absorption maximum of the absorption spectrum in acetonitrile of photoinitiator 2 in the range between 280 and 320 nm is at least about 5 nm.

36. The composition of claim 35, wherein said composition, when cured at a dose of about 4.4 mJ/cm$^2$, has a percentage reacted acrylate unsaturation of at least 56%.

37. The composition of claim 35, wherein said composition, when cured at a dose of about 4.4 mJ/cm$^2$, has a percentage reacted acrylate unsaturation of at least 60%.

38. The composition of claim 35, wherein said composition, when cured at a dose of about 4.4 mJ/cm$^2$, has a percentage reacted acrylate unsaturation of at least 66%.

39. The composition according to claim 35, wherein the ratio Ci:C of the amount of individual photoinitiator (Ci) to the total amount of photoinitiators (C) is about 50% or less.

40. The radiation-curable composition of claim 35, wherein said reactive diluent is propoxylated nonyl phenol acrylate.

41. The radiation-curable composition of claim 35, wherein said oligomer is derived from:
   (i) one or more polytetramethylene glycols;
   (ii) isophorone diisocyanate, dicyclohexylmethane diisocyanate, and/or the trimer of hexamethylene diisocyanate; and
   (iii) hydroxyethylacrylate.

42. The radiation-curable composition of claim 1, wherein said oligomer has a molecular weight in the range of 2,000-6,000 g/mol.

43. The radiation-curable composition of claim 41, wherein said composition is an inner primary coating composition for optical fibers.

44. The radiation-curable composition of claim 35, wherein said reactive diluent is hexane diol diacrylate.

45. The radiation-curable composition of claim 44, wherein said oligomer is derived from, relative to the weight of the oligomer:
   (i) 25-35 wt % of isophorone diisocyanate and/or dicyclohexylmethane diisocyanate;
   (ii) 25-40 wt % of polytetramethylene glycol;
   (iii) 15-30 wt % of hydroxyethylacrylate;
   (iv) 5-15 wt % of hexane diol; and
   (v) 5-15 wt % of adipic acid.

46. The radiation-curable composition of claim 35, wherein said oligomer is derived from:
   (i) one or more polytetramethylene glycols;
   (ii) isophorone diisocyanate and/or dicyclohexylmethane diisocyanate;
   (iii) hydroxyethylacrylate; and
   (iv) optionally, hexane diol and adipic acid.

47. The composition of claim 46, wherein said oligomer has a molecular weight of 1,000-5,000 g/mol.

48. The radiation-curable composition of claim 35, wherein said oligomer is derived from, relative to the weight of the oligomer:
   (i) 25-35 wt % of isophorone diisocyanate and/or dicyclohexylmethane diisocyanate;
   (ii) 25-40 wt % of polytetramethylene glycol;
   (iii) 15-30 wt % of hydroxyethylacrylate;
   (iv) 5-15 wt % of hexane diol; and
   (v) 5-15 wt % of adipic acid.

49. The radiation-curable composition of claim 35, wherein said composition further comprises a silane coupling agent.

50. The radiation-curable composition of claim 35, wherein said radiation-curable composition, when cured at a dose of about 4.4 mJ/cm$^2$, has a percentage reacted acrylate unsaturation of at least 56%.

51. The radiation-curable composition of claim 35, wherein said radiation-curable composition, when cured at a dose of about 4.4 mJ/cm$^2$, has a percentage reacted acrylate unsaturation of at least 60%.

52. The radiation-curable composition of claim 35, wherein said radiation-curable composition, when cured at a dose of about 4.4 mJ/cm$^2$, has a percentage reacted acrylate unsaturation of at least 66%.

53. The radiation-curable composition of claim 35, wherein said radiation-curable composition cures faster than a comparable composition, said comparable composition being identical to said radiation-curable composition except that said at least three photoinitiators in said radiation-curable composition have been replaced in said comparable composition with an equal weight amount of 1-hydroxycyclohexyl-phenyl ketone photoinitiator.

54. The radiation-curable composition of claim 53, wherein the ratio of the percentage reacted acrylate unsaturation of said radiation-curable composition to the percentage reacted acrylate unsaturation of said comparable composition, when both are cured at a dose of 4.4 mJ/cm$^2$, is at least 1.1.

55. The radiation-curable composition of claim 53, wherein said at least three photoinitiators include 1-hydroxy-cyclohexyl-phenyl ketone.

56. The radiation-curable composition of claim 35, wherein said oligomer comprises an aromatic group.

57. The radiation-curable composition of claim 35, wherein said oligomer is an aliphatic oligomer.

* * * * *

(12) INTER PARTES REVIEW CERTIFICATE (40th)
United States Patent  (10) Number: US 7,276,543 K1
Bishop et al.  (45) Certificate Issued: Nov. 3, 2014

(54) RADIATION CURABLE RESIN COMPOSITION

(75) Inventors: Timothy E. Bishop; Paul E. Snowwhite; Tyson Norlin; James J. Schouten; John Southwell; Anthony Toussaint

(73) Assignee: DSM IP Assets B.V.

Trial Number:

IPR2013-00052 filed Nov. 19, 2012

Petitioner: Corning Incorporated

Patent Owner: DSM IP Assets BV

Inter Partes Review Certificate for:

Patent No.: 7,276,543
Issued: Oct. 2, 2007
Appl. No.: 09/972,203
Filed: Oct. 9, 2001

The results of IPR2013-00052 and IPR2013-00053 are reflected in this inter partes review certificate under 35 U.S.C. 318(b).

INTER PARTES REVIEW CERTIFICATE
U.S. Patent 7,276,543 K1
Trial No. IPR2013-00052
Certificate Issued Nov. 3, 2014

AS A RESULT OF THE INTER PARTES REVIEW PROCEEDING, IT HAS BEEN DETERMINED THAT:

Claims 24, 25, 32-34, 36-38, 40-43 and 45-52 are found patentable.

Claims 11-23, 26-31, 35, 39, 44 and 53-57 are cancelled.

\* \* \* \* \*